(12) United States Patent
Yasuda et al.

(10) Patent No.: US 9,945,398 B2
(45) Date of Patent: Apr. 17, 2018

(54) POWER TRANSMISSION ASSEMBLY FOR A VEHICLE

(71) Applicant: KANZAKI KOKYUKOKI MFG. CO., LTD., Amagasaki-shi (JP)

(72) Inventors: Toshifumi Yasuda, Amagasaki (JP); Akihiro Ima, Amagasaki (JP); Takashi Nishizawa, Amagasaki (JP)

(73) Assignee: Kanzaki Kokyukoki Mfg. Co., Ltd., Amagasaki-shi (JP)

( * ) Notice: Subject to any disclaimer, the term of this patent is extended or adjusted under 35 U.S.C. 154(b) by 410 days.

(21) Appl. No.: 14/661,787

(22) Filed: Mar. 18, 2015

(65) Prior Publication Data

US 2015/0267721 A1    Sep. 24, 2015

(30) Foreign Application Priority Data

Mar. 19, 2014  (JP) ................. 2014-056785

(51) Int. Cl.

| F16H 39/10 | (2006.01) |
|---|---|
| F15B 15/06 | (2006.01) |
| B60K 17/04 | (2006.01) |
| B60K 17/10 | (2006.01) |
| F16H 47/04 | (2006.01) |

(52) U.S. Cl.
CPC ............ *F15B 15/06* (2013.01); *B60K 17/043* (2013.01); *B60K 17/105* (2013.01); *F16H 39/10* (2013.01); *F16H 47/04* (2013.01); *B60Y 2200/415* (2013.01)

(58) Field of Classification Search
CPC ...... B60K 17/04; B60K 17/043; B60K 17/10; B60K 17/105; B60Y 2200/415; F15B 15/06; F16H 39/00; F16H 39/10; F16H 39/16; F16H 47/02; F16H 47/04
See application file for complete search history.

(56) References Cited

U.S. PATENT DOCUMENTS

| 5,928,099 A   * | 7/1999  | Tsunemi ............. B60K 7/0015 |
|---|---|---|
|                 |         | 180/9.62 |
| 7,134,278 B2 * | 11/2006 | Sakikawa ............. A01D 69/03 |
|                 |         | 60/484 |
| 8,327,639 B1   | 12/2012 | Hauser et al. |
| 2007/0015619 A1* | 1/2007 | Sasahara ............. B60K 7/0007 |
|                 |         | 475/178 |

* cited by examiner

Primary Examiner — Logan Kraft
(74) Attorney, Agent, or Firm — Sterne, Kessler, Goldstein & Fox P.L.L.C.

(57) ABSTRACT

A power transmission assembly for a vehicle with prime mover, prime mover output shaft, and right and left traveling devices, comprises a power distribution unit that receives rotary power from the prime mover output shaft and distributes it between right and left transmission units, which each include: a center section with a closed fluid circuit, a lateral first portion, and a second portion perpendicular thereto; a hydraulic pump mounted on the first portion such that a pump shaft is parallel to the prime mover output shaft; a hydraulic motor on the second portion fluidly connected to the hydraulic pump via the closed fluid circuit, having a lateral motor shaft; and a speed reduction device on a distal side of the hydraulic motor that transmits power from the hydraulic motor to the right or left traveling device.

2 Claims, 15 Drawing Sheets

POWER TRANSMISSION ASSEMBLY FOR A VEHICLE

CROSS-REFERENCE TO RELATED APPLICATIONS

The present application claims priority to Japanese Patent Application No. 2014-056785, filed on Mar. 19, 2014.

BACKGROUND OF THE INVENTION

1. Field of the Invention

The present invention relates to a power transmission assembly for a vehicle.

2. Related Art

As disclosed by U.S. Pat. No. 8,327,639 B, there is a well-known conventional working vehicle, such as a lawn mower, a skid steer loader, or a track loader, which is equipped with an engine, and right and left traveling devices driven by power of the engine. The driving directions and speeds of the respective right and left traveling devices are individually controlled for turning the vehicle, instead of a steering mechanism. Typical right and left traveling devices use right and left drive wheels or crawlers.

The vehicle is equipped with a power transmission system for transmitting power of the engine to the right and left traveling devices. The power transmission system includes a power distribution unit, right and left fluid duct plates (center sections), right and left hydraulic pumps, right and left hydraulic motors, and right and left speed reduction devices.

Right and left fluid duct plates face each other at respective proximal side surfaces thereof. The power distribution unit is configured between upper portions of the proximal side surfaces of the right and left fluid duct plates. An input shaft of the power distribution unit is extended in the vertical (or fore-and-aft horizontal) direction of the vehicle, and is provided thereon with a pulley for driving connection to a vertical (or fore-and-aft horizontal) engine output shaft of the engine.

The right and left hydraulic pumps are mounted onto the upper portions of the proximal side surfaces of the fluid duct plates so as to have respective pump shafts laterally horizontally extended perpendicular to the proximal side surfaces of the fluid duct plates. The power distribution unit includes a power directive conversion mechanism for transmitting the rotary power of the vertical (or fore-and-aft horizontal) input shaft to the laterally horizontal pump shafts. The power directive conversion mechanism includes a bevel gear fixed on the input shaft, and bevel gears fixed on the respective motor shafts so as to mesh with the bevel gear on the input shaft.

The right and left hydraulic motors are mounted on lower portions of the proximal side surfaces of the respective right and left fluid duct plates so as to be fluidly connected to the respective hydraulic pumps via respective closed fluid circuits formed in the fluid duct plates. Motor shafts of the respective right and left hydraulic motors are laterally horizontally extended perpendicular to the proximal side surface of the fluid duct plates. The right and left speed reduction devices are mounted on lower portions of distal side surfaces of the respective right and left fluid duct plates so as to support respective output shafts drivingly connected to the respective right and left traveling devices. Distal end portions of the motor shafts of the right and left hydraulic motors project distally from the respective fluid duct plates, so that the speed reduction devices drivingly connect the distal end portions of the respective motor shafts to the respective output shafts.

As mentioned above, the power directive conversion mechanism is complicated and expensive because it includes the bevel gears on the input shaft and on the pump shafts, thereby complicating the structure of the power distribution unit, and increasing costs for manufacturing the power distribution unit. Further, the bevel gears serving as the power directive conversion mechanism cause an increase in power loss, thereby increasing fuel costs. Further, the power distribution unit has a large lateral width to have the power directive conversion mechanism so that the vehicle should have a large lateral width.

Further, to constitute the power directive conversion mechanism, the right and left hydraulic pumps are integrated in the power distribution unit. In other words, the lateral width of the power distribution unit defines the span between the right and left fluid duct plates. Therefore, the right and left fluid duct plates are not able to be located freely so as to correspond to another vehicle having a different lateral width or having an engine at a different position.

SUMMARY OF THE INVENTION

An object of the invention is to provide an appropriate power transmission assembly for a vehicle, including a prime mover having a prime mover output shaft, and including right and left traveling devices.

To achieve the object, the power transmission assembly comprises a power distribution unit and right and left transmission units. The power distribution unit receives a rotary power from the prime mover output shaft, and distributes the rotary power between the right and left transmission units. The right and left transmission units transmit the distributed rotary powers to the respective right and left traveling devices. Each of the right and left transmission units includes a center section, a hydraulic pump, a hydraulic motor, and a speed reduction device. The center section includes a closed fluid circuit. The center section is bent to have a first portion extended in the lateral direction of the vehicle, and to have a second portion extended perpendicular to the lateral direction of the vehicle. The hydraulic pump includes a pump shaft. The hydraulic pump is mounted on the first portion of the center section so as to extend the pump shaft parallel to the prime mover output shaft. The hydraulic motor includes a motor shaft. The hydraulic motor is mounted on the second portion of the center section so as to be fluidly connected to the hydraulic pump via the closed fluid circuit, and so as to have the motor shaft extended in the lateral direction of the vehicle. The speed reduction device transmits power outputted from the hydraulic motor to the corresponding right or left traveling device. The speed reduction device is disposed on a distal side of the hydraulic motor.

Preferably, each of the right and left transmission units includes the hydraulic motor mounted on a proximal side of the second portion of the center section, and includes the speed reduction device mounted on a distal side of the second portion of the center section.

Alternatively, preferably, each of the right and left transmission units includes the hydraulic motor mounted on a distal side of the second portion of the center section, and includes the speed reduction device mounted on a distal side of the hydraulic motor.

Therefore, even if an input shaft of the power distribution unit is extended coaxially or parallel to the prime mover output shaft and is drivingly connected to the prime mover output shaft via a sleeve or a belt, an economic and simple mechanism, such as spur gears or pulleys and a belt, can be used to transmit power from the input shaft of the power distribution unit to the pump shafts of the right and left transmission units. Therefore, the power distribution unit has a simple structure such as to reduce costs for its manufacturing. Further, in comparison with the bevel gears, the spur gears reduce power loss, thereby reducing fuel costs. Further, the arrangement of the pump shafts parallel to the prime mover output shaft reduces a lateral width of the power distribution unit, thereby reducing a lateral width of a vehicle equipped with the power transmission assembly. Further, the separation of the hydraulic pumps from the power distribution unit enhance the freedom in arrangement and design of the right and left transmission units, so that the power transmission assembly can be freely modified to correspond to another vehicle having a different lateral width or having an engine at a different position.

Preferably, the center section includes an L-shaped plate when viewed in plan.

Therefore, the L-shaped plate is used to economically produce the center section having the first and second portions by few processes.

Preferably, the speed reduction device includes an input shaft, an eccentric core member, an external gear member, a stationary internal gear member, an output member, and a rotation constituent extraction mechanism. The input shaft is extended on an axial line and coaxially to the motor shaft of the corresponding hydraulic motor, and is drivingly connected to the motor shaft unrotatably relative to the motor shaft. The eccentric core member has a rotary axis disposed eccentrically to the axial line, and is drivingly connected to the input shaft unrotatably relative to the input shaft. The external gear member has external teeth on an outer peripheral surface thereof, and is fitted on the eccentric core member rotatably relative to the eccentric core member. The internal gear member has internal teeth on an inner peripheral surface thereof. The internal teeth of the internal gear member mesh with the external teeth of the external gear member, and wherein an inner diameter of the internal gear member is larger than an outer diameter of the external gear member so that the number of internal teeth of the internal gear member is different from the number of external teeth of the external gear member. The rotation constituent extraction mechanism extracts a rotation constituent for rotation of the output member centered on the axial line from rotation of the external gear members based on the rotation of the eccentric core member together with the input shaft, and on the meshing of the external teeth with the internal teeth.

Therefore, the speed reduction device is configured as a hypocycloid gear mechanism that ensures a sufficient reduction ratio while it is minimized in the radial direction and has a simple structure.

Preferably, the power transmission assembly is supported on a chassis of the vehicle via the speed reduction devices of the right and left transmission units.

Therefore, the power transmission assembly does not need another support member than the speed reduction devices of the right and left transmission units, thereby reducing parts in number and in cost.

These and other objects, features and advantages of the invention will appear more fully from the following detailed description of the invention with reference to the attached drawings.

DETAILED DESCRIPTION OF THE INVENTION

Figure 1:
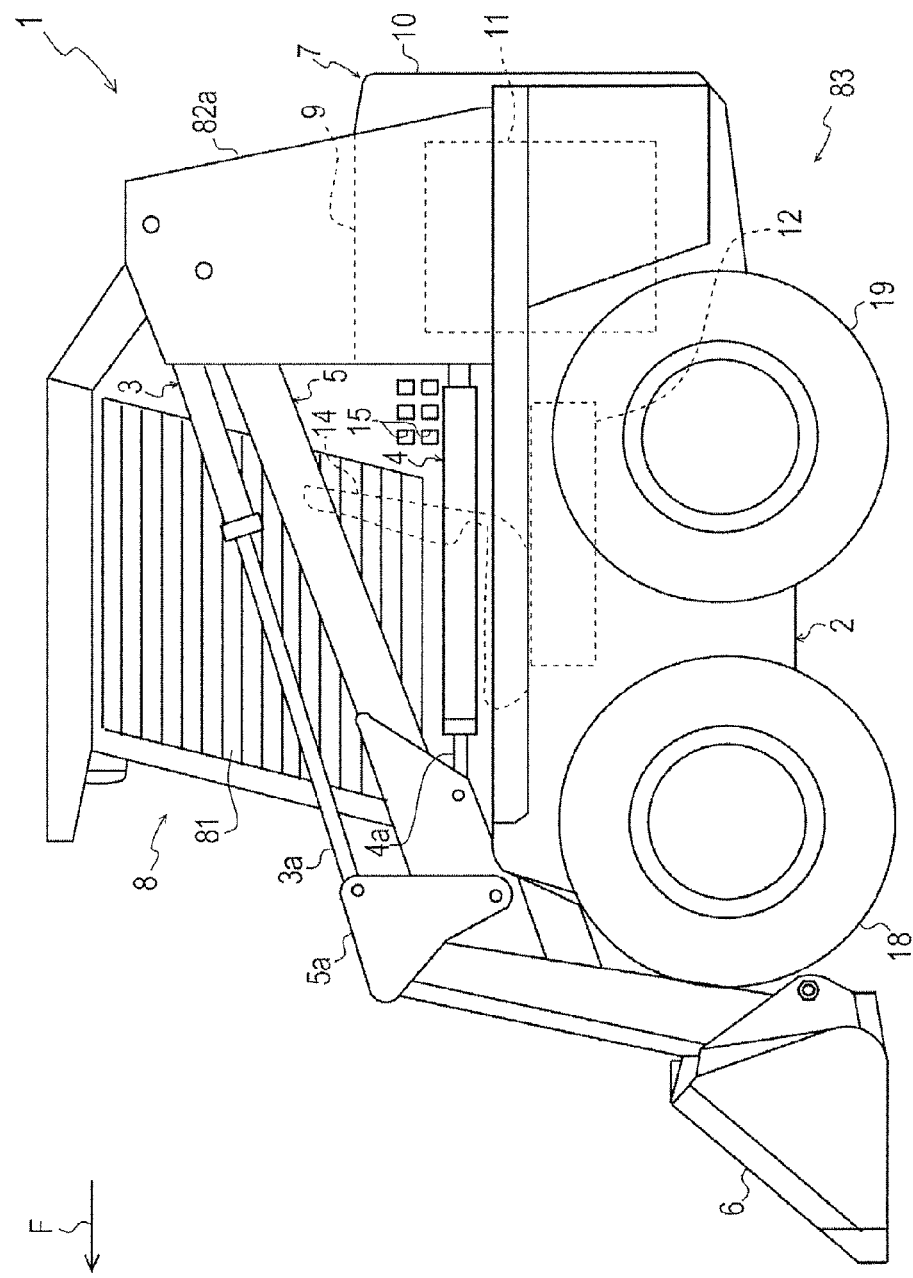
FIG. 1 is a side view of a skid steer loader 1 serving as an embodiment of a working vehicle equipped with a power transmission assembly 12 according to the invention.
Figure 9:
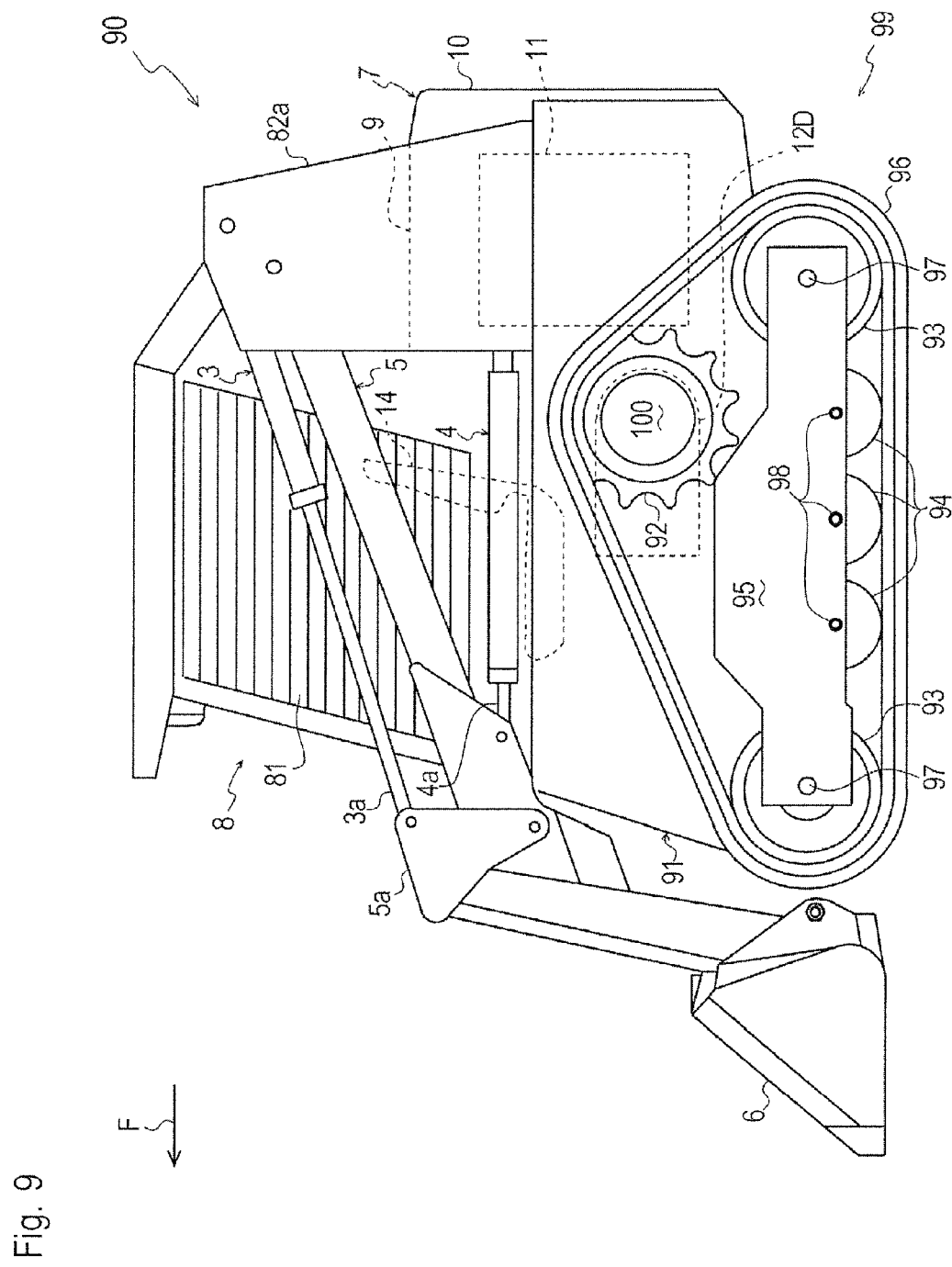
FIG. 9 is a side view of a track loader 90 serving as another embodiment of a working vehicle equipped with an alternative power transmission assembly 12D.

A skid steer loader 1 shown in FIG. 1 is assumed to face forward as designated by an arrow F in FIG. 1. Another later-discussed track loader 90 shown in FIG. 9 is also assumed to face forward as designated by arrow F in FIG. 9. All the following descriptions of components of loaders 1 and 90 with reference to all the other drawings will be given on the assumption that arrow F in each drawing designates the forward direction of loader 1 or 90.

Further, words "proximal" and "distal" will be used on an assumption that if there are any two members or portions at different positions in the lateral direction of loader 1 or 90, one closer to the lateral center of loader 1 or 90 is defined as being "proximal", and another farther from the lateral center of loader 1 or 90 is defined as being "distal".

Figure 2:
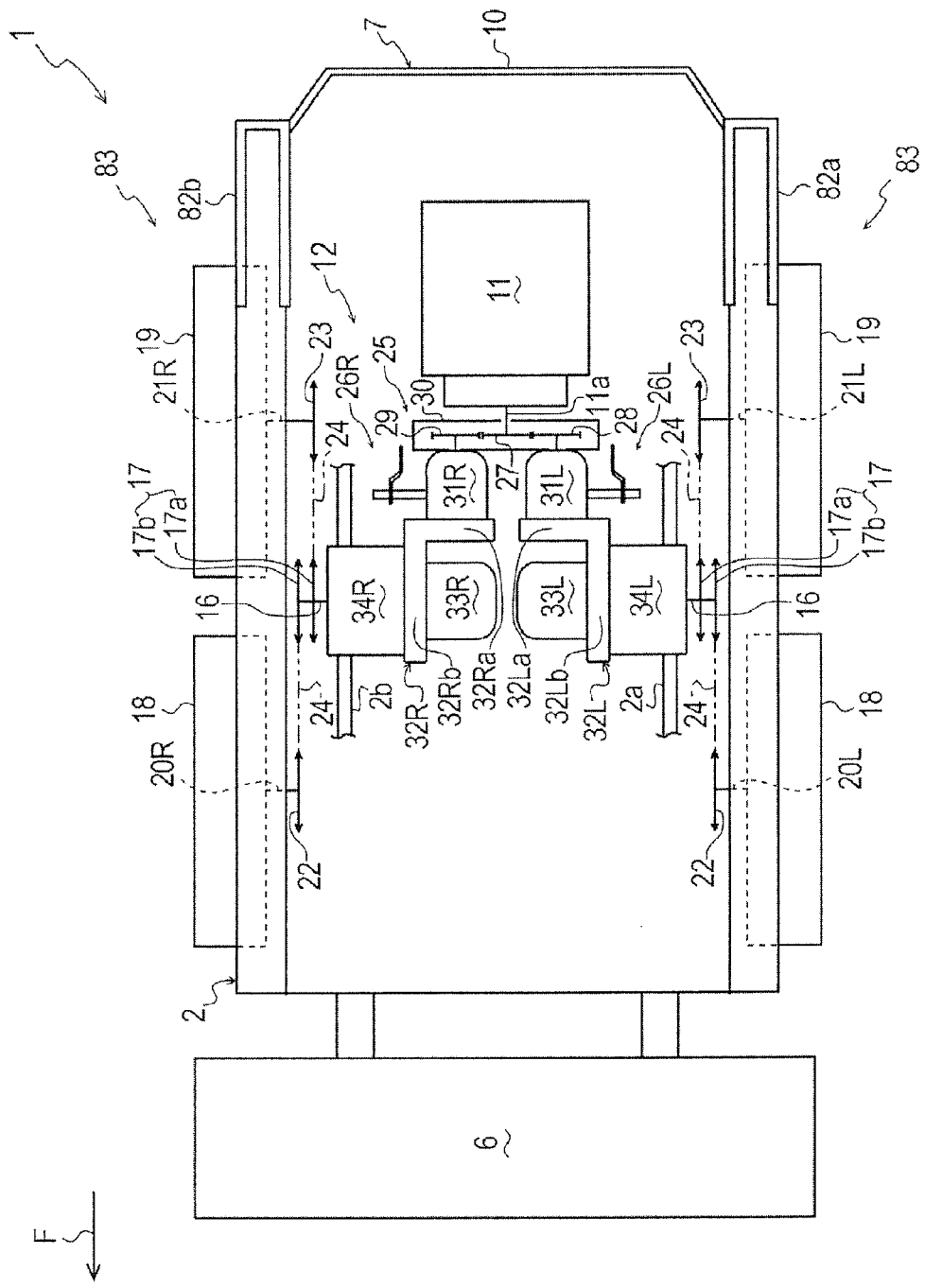
FIG. 2 is a schematic plan view of skid steer loader 1.

Skid steer loader 1 will be described with reference to FIGS. 1 to 3. Right and left pillars 82a and 82b are provided on a rear upper portion of a chassis 2 of skid steer loader 1. Cylinders 3 and 4 and an arm 5 are pivoted on each of pillars 82a and 82b. Piston rods 3a of cylinders 3 are connected to respective arms 5 via respective connection members 5a. Piston rods 4a of cylinders 4 are connected directly to respective arms 5. A bucket 6 is rotatably attached onto utmost ends of arms 5. Therefore, arms 5 and connection rods 5a are rotated by telescopic movement of piston rods 3a and 4a so as to rotate bucket 6 for loading.

An engine room 7 and an operator's room 8 are provided on chassis 2. An engine hood 9 and a rear cover 10 are hinged on chassis 2, so that engine hood 9 defines a top portion of engine room 7, and rear cover 10 defines a rear portion of engine room 7. An engine 11 is disposed in engine room 7. Engine 11 is accessible for maintenance or the like by opening engine hood 9 and rear cover 10.

A power transmission assembly 12 for transmitting power from engine 11 to its right and left output shafts 16 is extended forward from engine 11 so that engine 11 and power transmission assembly 12 are placed on a rear half portion of chassis 2 so as to balance skid steer loader 1 in weight in the fore-and-aft direction, especially at work with bucket 6.

Right and left operator guards 81 define right and left ends of operator's room 8. An operator's seat 14 is disposed in operator's room 8. Right and left operator guards 81 are formed with air openings 15 rearward from operator's seat 14. An unshown fan is disposed in engine room 7 and is driven by engine 11 so as to introduce air from outside into engine room 7, thereby cooling engine 11 in engine room 7.

Right and left traveling devices 83 are disposed at right and left lower portions of chassis 2 so as to support chassis 2. Each traveling device 83 includes a front wheel 18 and a rear wheel 19. Right and left front axles 20R and 20L are fixedly provided on distal ends thereof with respective front wheels 18, and on proximal ends thereof with respective driven sprockets 22. Right and left rear axles 21R and 21L are fixedly provided on distal ends thereof with respective rear wheels 19, and on proximal ends thereof with respective driven sprockets 23.

Right and left output shafts 16 are extended rightward and leftward from power transmission assembly 12. A double sprocket 17, consisting of proximal and distal driving sprockets 17a and 17b, is fixed on a distal end portion of each output shaft 16. A chain 24 is interposed between each driving sprocket 17b and each driven sprocket 22 so as to drivingly connect each output shaft 16 to each front wheel 18. Another chain 24 is interposed between each driving sprocket 17a and each driven sprocket 23 so as to drivingly connect each output shaft 16 to each rear wheel 19.

Therefore, in each of right and left traveling devices 83, front wheel 18 and rear wheel 19 are driven synchronously with each other by corresponding common output shaft 16 via sprockets 17a, 17b, 22 and 23 and chains 24. To turn skid steer loader 1, right and left output shafts 16 of power transmission assembly 12 are controlled so as to rotate at different speeds in the same direction, or so as to rotate in opposite directions.

Power transmission assembly 12 will be described with reference to FIGS. 2 to 5. As shown in FIGS. 2 and 3, power transmission assembly 12 includes a power distribution unit 25 and right and left transmission units 26R and 26L. Power distribution unit 25 is disposed forward from engine 11. Right and left transmission units 26R and 26L are extended forward from right and left portions of power distribution unit 25, and are attached to right and left side frame portions 2a and 2b of chassis 2.

Power distribution unit 25 distributes power from engine output shaft 11a of engine 11 to right and left transmission units 26R and 26L. Each of right and left transmission units 26R and 26L controls the power from power distribution unit 25 in speed and direction, and outputs power to corresponding output shaft 16.

Power distribution unit 25 includes a distribution casing 30 disposed forward from engine 11. Engine output shaft 11a is extended into distribution casing 30 and is fixedly provided on a front end thereof with a distribution gear 27 in distribution casing 30. In distribution casing 30, distribution gear 27 is disposed between right and left input gears 28 and 29 so as to mesh with both input gears 28 and 29.

Right transmission unit 26R includes a hydraulic pump 31R, a center section (fluid duct plate) 32R, a hydraulic motor 33R and a speed reduction device 34R. Center section 32R is disposed forward from a right half portion of power distribution unit 25. Hydraulic pump 31R, hydraulic motor 33R and speed reduction device 34R are mounted on center section 32R.

Figure 3:
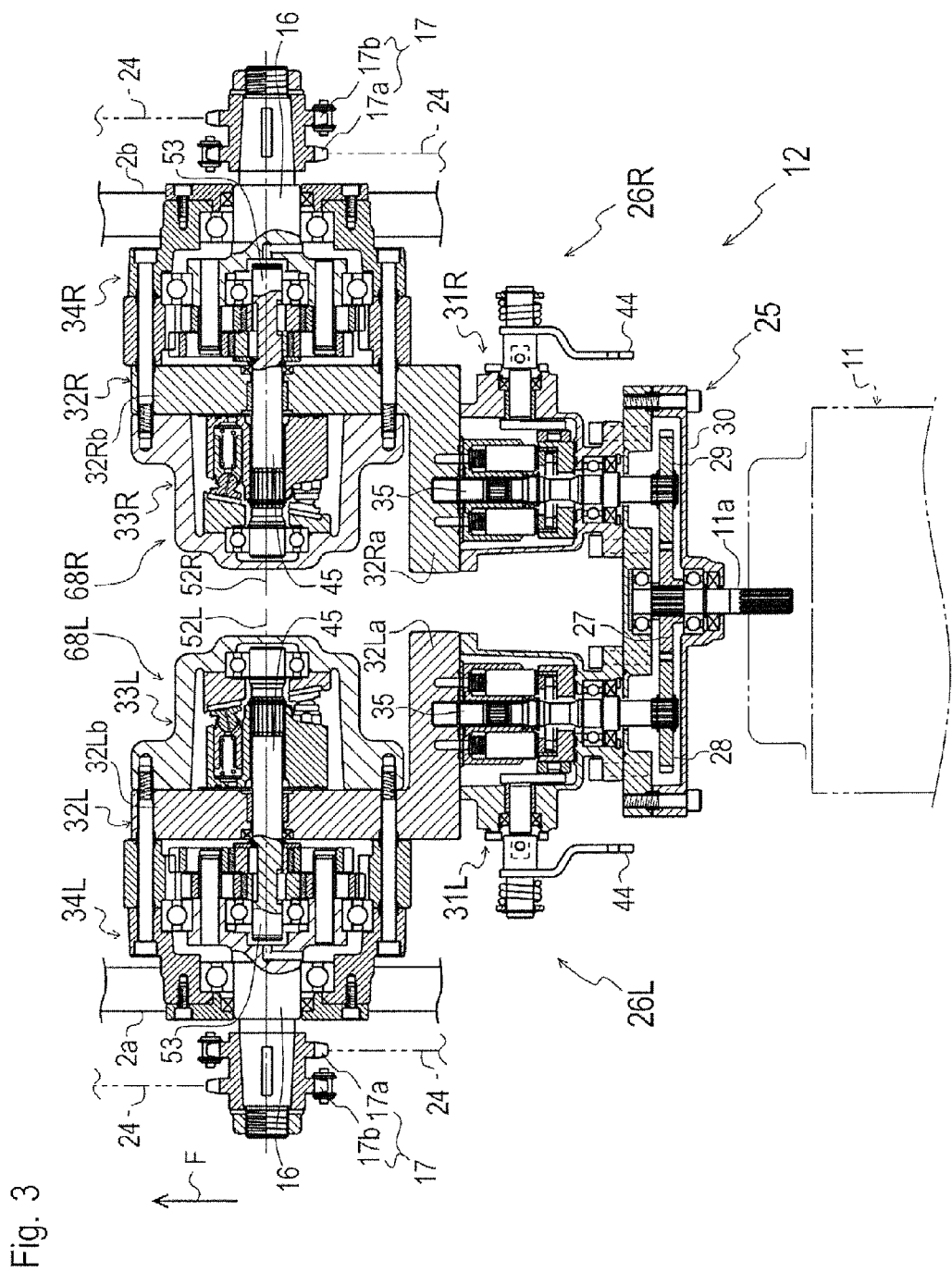
FIG. 3 is a sectional plan view of power transmission assembly 12.

When viewed in plan, as shown in FIG. 3, center section 32R is formed in a laterally-reversed L-shape so as to include a proximally laterally (i.e., leftwardly) extended rear portion 32Ra and a fore-and-aft (i.e., forwardly) extended front portion 32Rb. In other words, fore-and-aft front portion 32Rb is extended forward from a distal (i.e., right) end portion of lateral rear portion 32Ra. Hydraulic pump 31R is mounted on a rear end surface of lateral rear portion 32Ra. Hydraulic motor 33R is mounted on a proximal (i.e., left) side surface of fore-and-aft front portion 32Rb. Speed reduction device 34R is mounted on a distal (i.e., right) side surface of fore-and-aft front portion 32Rb laterally opposite hydraulic motor 33R.

Figure 4:
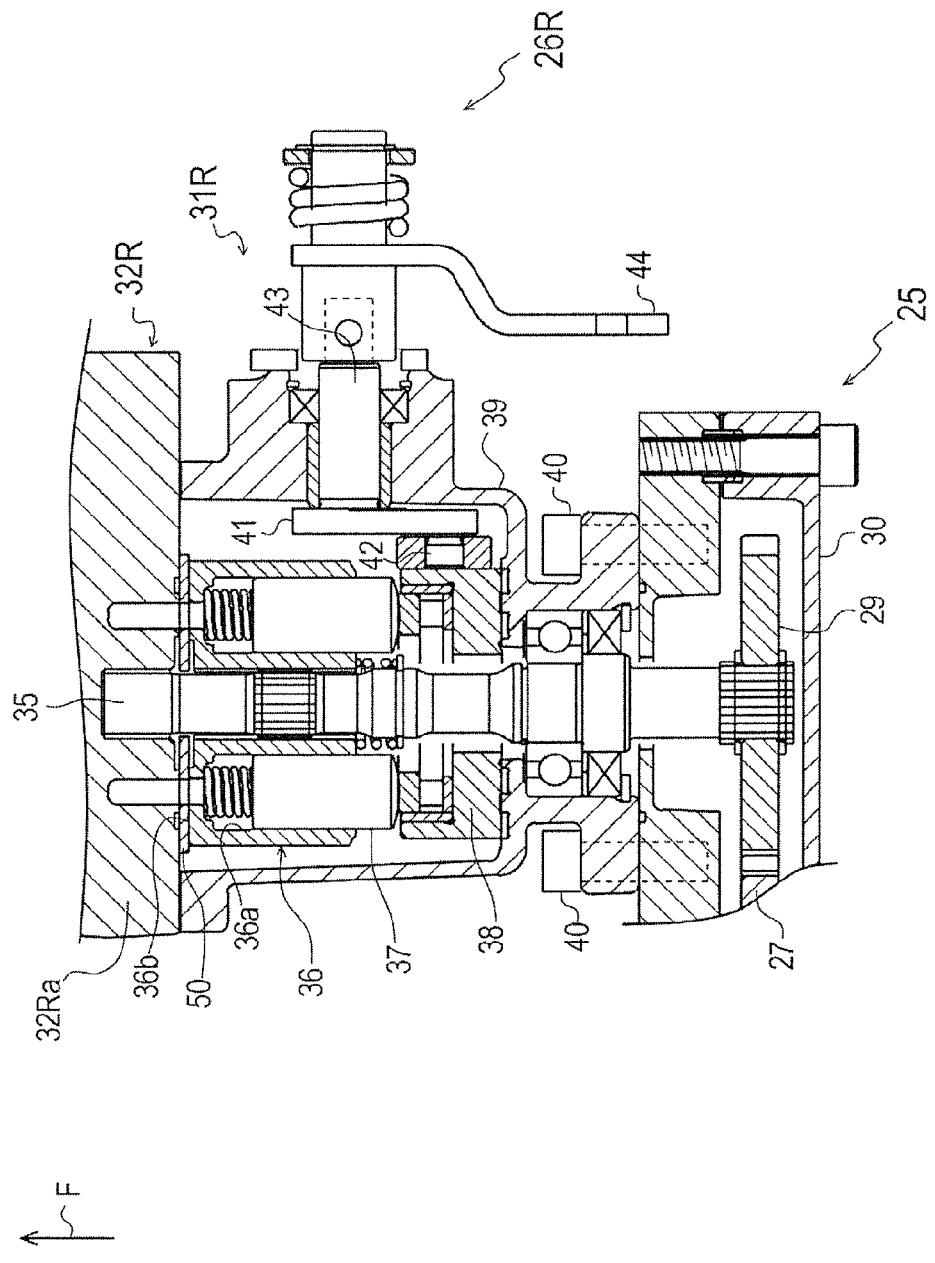
FIG. 4 is a sectional plan view of a hydraulic pump.

As shown in FIG. 4, hydraulic pump 31R is an axial piston type variable displacement hydraulic pump, which includes a pump shaft 35, a cylinder block 36, plungers 37, a movable swash plate 38, and a pump casing 39. Pump shaft 35 is extended horizontally in the fore-and-aft direction, i.e., parallel to engine output shaft 11a. Pump shaft 35 is fixedly provided on a rear end thereof with input gear 29 in distribution casing 30, and is journalled at a front end thereof by lateral rear portion 32Ra of center section 32R.

Cylinder block 36 is fixed on pump shaft 35, and is fitted at a front end surface thereof slidably onto the rear end surface of lateral rear portion 32Ra of center section 32R via a valve plate 50, so as to be rotatable integrally with pump shaft 35 and relative to center section 32R. Cylinders 36a are formed in cylinder block 36 and are aligned peripherally around pump shaft 35. Plungers 37 are fore-and-aft reciprocally slidably fitted into respective cylinders 36a. Movable swash plate 38 abuts against heads (i.e., rear ends) of plungers 37.

Pump casing 39 is fastened at a rear end thereof to a right half portion of a front surface of distribution casing 30 by bolts 40, and is fixed at a front end thereof to a rear surface of lateral rear portion 32Ra. Therefore, pump casing 39 journals pump shaft 35 at a rear end wall thereof via a bearing, supports movable swash plate 38 in a rear portion thereof, and incorporates cylinder block 36 and plungers 37 in a front portion thereof. In this way, hydraulic pump 31R is separable from power distribution unit 25 and center section 32R, while it is disposed between power distribution unit 25 and center section 32R.

In pump casing 39, a swing arm 41 is pivotally connected at a rear end thereof to movable swash plate 38 via a joint pin 42, and is fixedly provided at a front end portion thereof with a trunnion shaft 43. Trunnion shaft 43 is extended laterally distally (i.e., rightward) from swing arm 41, and is journalled by pump casing 39. A distal (i.e., right) end of trunnion shaft 43 projects outward from pump casing 39, and is fixedly provided thereon with a speed control arm 44. Therefore, by rotating speed control arm 44, trunnion shaft 43 is rotated so as to move joint pin 42 upward or downward, thereby changing a tilt angle of movable swash plate 38 so as to control the fluid delivery direction and amount of hydraulic pump 31R.

Figure 5:
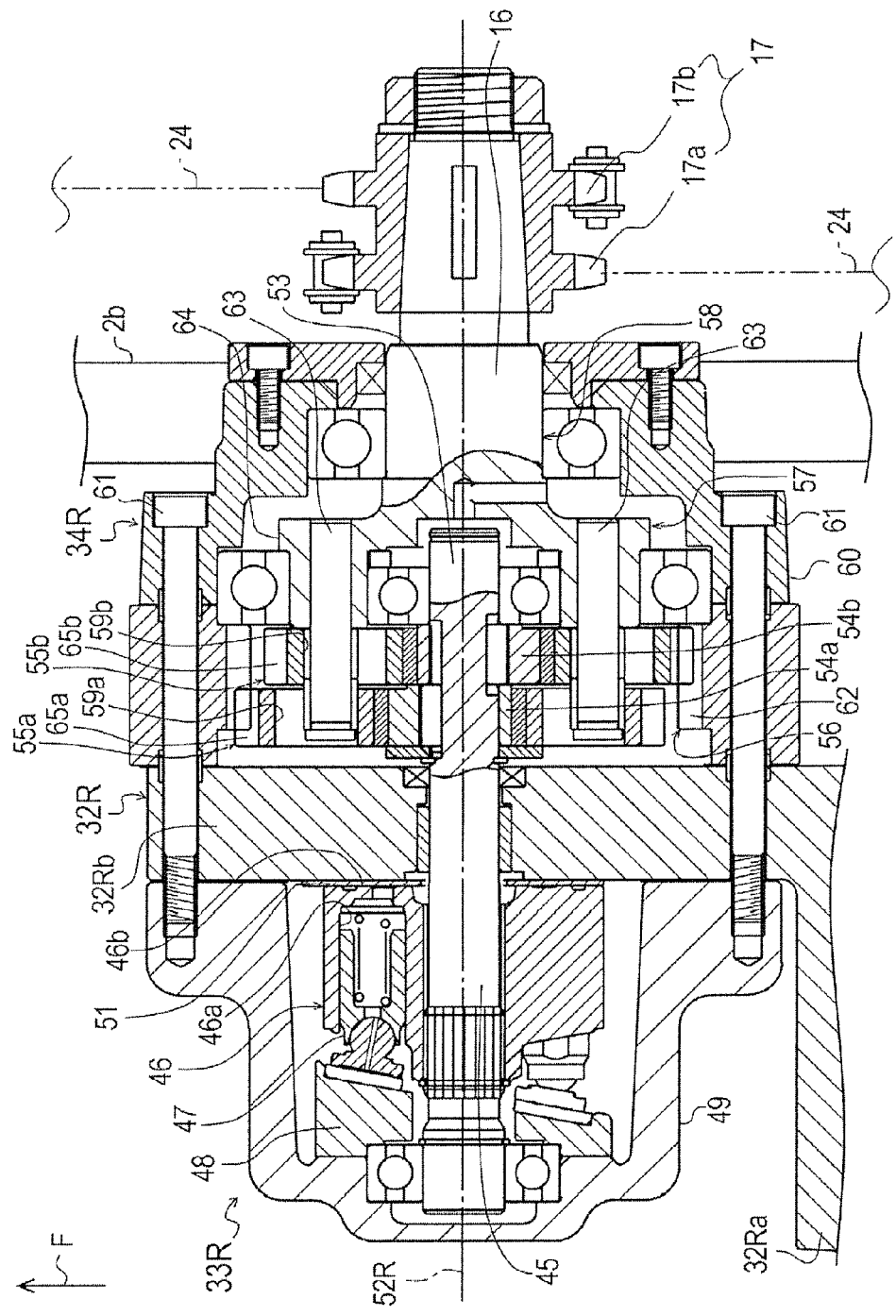
FIG. 5 is a sectional plan view of a hydraulic motor and a speed reduction unit.

As shown in FIG. 5, hydraulic motor 33R is an axial piston type fixed displacement hydraulic motor, which includes a motor shaft 45, a cylinder block 46, plungers 47, a fixed swash plate 48, and a motor casing 49. Motor shaft 45 is extended horizontally in the lateral direction and perpendicular to pump shaft 35. Motor shaft 45 is journalled at a proximal (i.e., left) end thereof via a bearing by a proximal (i.e., left) end wall of motor casing 49 fixed to fore-and-aft front portion 32Rb of center section 32R as discussed later, and is journalled at an axially intermediate portion thereof by fore-and-aft front portion 32Rb of center section 32R. Further, a distal (i.e., right) portion of motor shaft 45 projects distally (i.e., rightward) from fore-and-aft front portion 32Rb of center section 32R so as to serve as an input shaft 53 of speed reduction device 34R as discussed later.

Cylinder block 46 is fixed on motor shaft 45, and is fitted at a distal (i.e., right) end surface thereof slidably onto the proximal (i.e., left) end surface of fore-and-aft front portion 32Rb of center section 32R via a valve plate 51, so as to be rotatable integrally with motor shaft 45 and relative to center section 32R. Cylinders 46a are formed in cylinder block 46 and are aligned peripherally around motor shaft 45. Plungers 47 are laterally reciprocally slidably fitted into respective cylinders 46a. Fixed swash plate 48 abuts against heads (i.e., left ends) of plungers 47. Fixed swash plate 48 is settled at a determined tilt angle in motor casing 49.

Motor casing 49 is fastened at a distal (i.e., right) end thereof to a proximal (i.e., left) side surface of fore-and-aft front portion 32Rb of center section 32R by bolts 61. Therefore, motor casing 49 journals the proximal (i.e., left) end of motor shaft 45 at the proximal (i.e., left) end wall thereof, supports fixed swash plate 48 in a proximal (i.e., left) portion thereof, and incorporates cylinder block 46 and plungers 47 in a distal (i.e., right) portion thereof.

In this way, hydraulic motor 33R disposed on the proximal side (i.e., leftward) from fore-and-aft front portion 32Rb of center section 32R is separable from center section 32R, except that motor shaft 45 is shared between hydraulic motor 33R on the proximal side of fore-and-aft front portion 32Rb of center section 32R and speed reduction device 34R on the distal side of fore-and-aft front portion 32Rb of center section 32R. In this regard, alternatively, as discussed later, input shaft 53 of speed reduction device 34R may be separated from motor shaft 45 of hydraulic motor 33R, so that motor shaft 45 is journalled at a distal (i.e., right) end thereof by fore-and-aft front portion 32Rb of center section 32R, and hydraulic motor 33R is more easily separable from center section 32R and speed reduction device 34R mounted on center section 32R.

Center section 32R is formed therein with a pair of main fluid passages constituting a closed fluid circuit, which fluidly connects cylinders 36a in hydraulic pump 31R to cylinders 46a in hydraulic motor 33R.

Therefore, power of engine 11 is transmitted to right pump shaft 35 via engine output shaft 11a, distribution gear 27 and input gear 29 so as to drive hydraulic pump 31R. Fluid delivered from hydraulic pump 31R driven by the power of engine 11 is supplied to hydraulic motor 33R via the main fluid passages in center section 32R so as to drive hydraulic motor 33R. Hydraulic pump 31R, center section 32R and hydraulic motor 33R constitute a hydrostatic stepless transmission (HST) 68R. Power outputted from HST 68R is reduced in speed by speed reduction device 34R, and is outputted from right output shaft 16.

Referring to FIG. 3, left transmission unit 26L includes a hydraulic pump 31L, a center section (fluid duct plate) 32L, a hydraulic motor 33L and a speed reduction device 34L, and is disposed forward from a left half portion of power distribution unit 25.

When viewed in plan, as shown in FIG. 3, center section 32L is formed in an L-shape so as to include a proximally laterally (i.e., rightwardly) extended rear portion 32La and a fore-and-aft (i.e., forwardly) extended front portion 32Lb. In other words, fore-and-aft front portion 32Lb is extended forward from a distal (i.e., left) end portion of lateral rear portion 32La. Hydraulic pump 31L is mounted on a rear end surface of lateral rear portion 32La. Hydraulic motor 33L is mounted on a proximal (i.e., right) side surface of fore-and-aft front portion 32Lb. Speed reduction device 34L is mounted on a distal (i.e., left) side surface of fore-and-aft front portion 32Lb laterally opposite hydraulic motor 33L. Pump shaft 35 of hydraulic pump 31L is extended parallel to engine output shaft 11a, and motor shaft 45 of hydraulic motor 33L is extended perpendicular to pump shaft 35 of hydraulic pump 31L. Hydraulic pump 31L is separable from power distribution unit 25 and center section 32L, while it is disposed between power distribution unit 25 and center section 32L.

In this way, left center section 32L is laterally symmetric in shape and arrangement with right center section 32R, and hydraulic pump 31L, hydraulic motor 33L and speed reduction device 34L are mounted on left center section 32L so as to be laterally symmetrically with hydraulic pump 31R, hydraulic motor 33R and speed reduction device 34R mounted on right center section 32R. In this regard, a plate bent in an L-shape can be used as either right center section 32R or left center section 32L. The L-like bent plate is simple and economic, and the standardization of the L-like bent plate for both right and left center sections 32R and 32L further reduces costs.

Therefore, power of engine 11 is transmitted to left pump shaft 35 via engine output shaft 11a, distribution gear 27 and input gear 28 so as to drive hydraulic pump 31L. Fluid delivered from hydraulic pump 31L driven by the power of engine 11 is supplied to hydraulic motor 33L via main fluid passages formed in center section 32L so as to drive hydraulic motor 33L. Hydraulic pump 31L, center section 32L and hydraulic motor 33L constitute a hydrostatic stepless transmission (HST) 68L. Power outputted from HST 68L is reduced in speed by speed reduction device 34L, and is outputted from left output shaft 16.

Referring to FIGS. 3 and 5, each of right and left speed reduction devices 34R and 34L will be described on the assumption that FIG. 5 illustrates only representative right speed reduction device 34R while right and left speed reduction devices 34R and 34L are identical to each other except that they are laterally symmetric in shape and arrangement.

Referring to FIGS. 3 and 5, each of speed reduction devices 34R and 34L is a hypocycloid reduction gear mechanism, which includes input shaft 53, eccentric members 54a and 54b, external gear members 55a and 55b, an internal gear member 56, a rotation constituent extraction mechanism 57, an output member 58, and a reduction gear casing 60.

Referring to FIG. 5, reduction gear casing 60 is disposed at a distal side of corresponding fore-and-aft front portion 32Rb or 32Lb of center section 32R or 32L. Internal gear member 56 is interposed between reduction gear casing 60 and fore-and-aft front portion 32Rb or 32Lb of center section 32R or 32L. Bolts 61 are screwed into motor casing 49 through fore-and-aft front portion 32Rb or 32Lb of center section 32R or 32L so as to fasten reduction gear casing 60, internal gear member 56, fore-and-aft front portion 32Rb or 32Lb of center section 32R or 32L, and motor casing 49 together. Mutually joined internal gear member 56 and reduction gear casing 60 incorporate input shaft 53, eccentric members 54a and 54b, external gear members 55a and 55b, internal gear member 56, rotation constituent extraction mechanism 57, and output member 58.

FIG. 3 illustrates right and left axial lines 52R and 52L for motor shafts 45 of right and left hydraulic motors 33R and 33L and input shafts 53 of right and left speed reduction devices 34R and 34L. Right and left axial lines 52R and 52L are coaxial, and each of right and left axial lines 52R and 52L passes each of fore-and-aft front portions 32Rb and 32Lb of right and left center sections 32R and 32L so as to serve as axes of corresponding motor shaft 45 and input shaft 53 coaxial to each other. In other words, on each of axial lines 52R and 52L, motor shaft 45 is extended laterally proximally from corresponding front portion 32Rb or 32Lb of center section 32R or 32L, and input shaft 53 is extended laterally distally from corresponding front portion 32Rb or 32Lb of center section 32R or 32L.

Each input shaft 53 is rotatably centered on corresponding axial line 52R or 52L and is rotatably integral with corresponding motor shaft 45. In the illustrated embodiment, a single shaft serves as both motor shaft 45 and input shaft 53, so that a portion of the single shaft extended laterally proximally from fore-and-aft front portion 32Rb or 32Lb of center section 32R or 32L serves as motor shaft 45, and another portion of the single shaft extended laterally distally from fore-and-aft front portion 32Rb or 32Lb of center section 32R or 32L serves as input shaft 53. Alternatively, motor shaft 45 and input shaft 53 on each of axial lines 52R and 52L may be different shafts separably connected to each other so as to be rotatably centered on axial line 52R or 52L and so as to be rotatably integral with each other.

All external gear members 55a and 55b and internal gear member 56 are formed as hypocycloid gears, such as involute gears or circular arc gears.

Eccentric core members 54a and 54b are aligned along corresponding axial line 52R or 52L and are fixed on each of input shafts 53 so as to have respective axes disposed eccentrically to corresponding axial line 52R or 52L. Therefore, during the rotation of input shaft 53 centered on axial line 52R or 52L, eccentric core members 54a and 54b rotate eccentrically to axial line 52R or 52L.

External gear member 55a is fitted on eccentric core member 54a, and external gear member 55b on eccentric core member 54b, so that eccentric core members 54a and 54b serve as rotary axial cores of respective external gear members 55a and 55b. More specifically, external gear members 55a and 55b tend to rotate following respective rotating eccentric gear members 54a and 54b, however, external gear members 55a and 55b are allowed to rotate relative to respective eccentric gear members 54a and 54b.

External gear member 55a is formed with cam holes 59a extended laterally to be open at right and left ends of external gear member 55a, and external gear members 55b is formed with cam holes 59b similarly. In external gear member 55a, cam holes 59a are aligned peripherally around eccentric core member 54a. In external gear member 55b, cam holes 59b are aligned peripherally around eccentric core member 54b, and are disposed so as to overlap respective cam holes 59a in external gear member 55a when viewed along axial line 52R or 52L.

External gear member 55a is formed on an outer peripheral surface thereof with gear teeth 65a, and external gear member 55b with gear teeth 65b, so that gear teeth 65a and 65b serve as external gears on respective external gear members 55a and 55b. Ring-shaped internal gear member 56 is formed on an inner peripheral surface thereof with gear teeth 62, which serve as an internal gear on internal gear member 56 and mesh with gear teeth 65a and 65b serving as the external gears on external gear members 55a and 55b. The number of each of gear teeth 65a and 65b is smaller than the number of gear teeth 62.

Output member 58 is formed with a flange 64. Carrier pins 63 are extended laterally proximally from flange 64, and are inserted into respective overlapping portions of cam holes 59a and 59b. Output member 58 is formed to have a portion extended laterally distally from flange 64 along each of axial lines 52R and 52L so as to serve as output shaft 16. Therefore, carrier pins 63 revolve around each of axial lines 52R and 52L integrally with rotation of output shaft 16. Output shaft 16 is disposed on each axial line 52R or 52L coaxially to input shaft 53 and motor shaft 45.

During rotation of input shaft 53, rotations of external gear members 55a and 55b are based on the rotations of eccentric core members 54a and 54b eccentric to axial line 52R or 52L serving as the rotary axis of input shaft 53, and on the meshing of gear teeth 65a and 65b of external gear members 55a and 55b with gear teeth 62 of internal gear member 65. In other words, external gear members 55a and 55b tend to rotate following the eccentric rotations of eccentric core members 54a and 54b, however, gear teeth 65a and 65b receive speed reduction forces from gear teeth 62 against the rotations of external gear members 55a and 55b following the rotations of eccentric core members 54a and 54b, thereby reducing the rotation speeds of external gear members 55a and 55b. In this regard, the relation of teeth number of each of gear teeth 65a and 65b to gear teeth 62 defines the reduction speed of external gear members 55a and 55b.

Due to the rotations of external gear members 55a and 55b, inner peripheral surfaces of cam holes 59a and 59b function as cams for carrier pins 63. In other words, the inner peripheral surfaces of cam holes 59a and 59b in rotating external gear members 55a and 55b push and roll respective carrier pins 63 so as to define the revolution of carrier pins 63 around axial line 52R or 52L, thereby causing the rotation of flange 64 with output shaft 16 centered on axial line 52R or 52L.

Therefore, external gear members 55a and 55b formed with cam holes 59a and 59b, carrier pins 63, and flange 64 constitute rotation constituent extraction mechanism 57 that extracts the rotation constituent for the rotation of output shaft 16 centered on axial line 52R or 52L from the rotations of external gear members 55a and 55b based on the rotations of eccentric core members 54a and 54b and on the meshing of gear teeth 65a and 65b with gear teeth 62.

Right and left side frame portions 2a and 2b of chassis 2 are extended in the fore-and-aft direction of skid steer loader 1. Reduction gear casing 60 of left speed reduction device 34L is fixed at a distal (i.e., left) end portion thereof to left side frame portion 2a of chassis 2, thereby attaching left transmission unit 26L to left side frame portion 2a. Reduction gear casing 60 of right speed reduction device 34R is fixed at a distal (i.e., right) end portion thereof to right side frame portion 2b of chassis 2, thereby attaching right transmission unit 26R to right side frame portion 2b.

Figure 6:
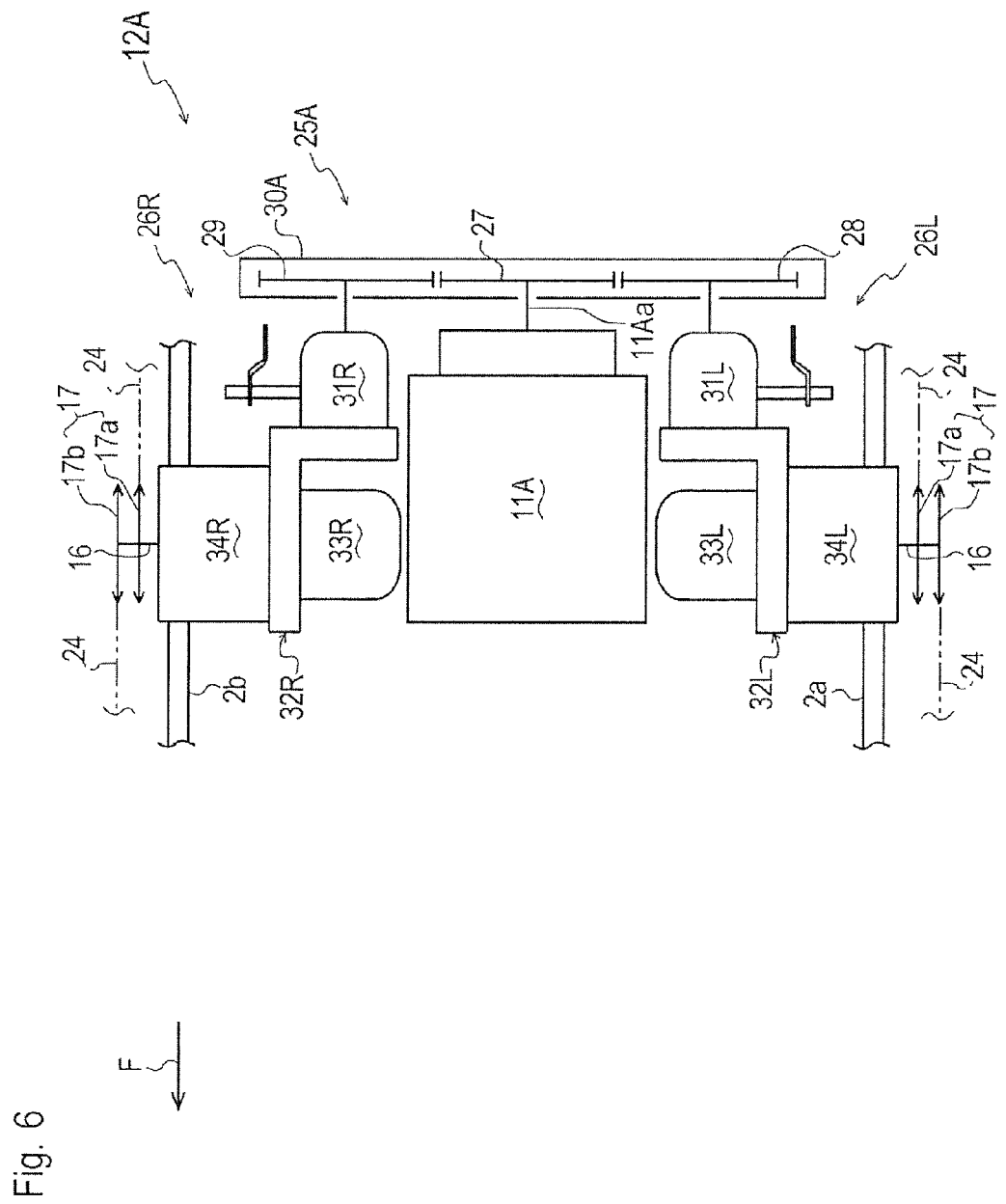
FIG. 6 is a schematic plan view of an alternative power transmission assembly 12A.

Referring to FIG. 6, an alternative power transmission assembly 12A will now be described. Power transmission assembly 12A includes an alternative power distribution unit 25A and right and left transmission units 26R and 26L. Power transmission assembly 12A is configured so as to have an engine 11A disposed between right and left transmission units 26R and 26L and forward from power distribution unit 25A. In other words, power distribution unit 25A of power transmission assembly 12A has distribution casing 30 whose lateral width is sufficiently large so as to have engine 11A disposed between right and left transmission units 26R and 26L extended forward from right and left portions of distribution casing 30. An engine output shaft 11Aa of engine 11A is extended rearward into distribution casing 30 of power distribution unit 25A, and is fixedly provided on a rear end thereof with distribution gear 27.

Right and left transmission units 26R and 26L are attached to right and left side frame portions 2a and 2b of chassis 2 of skid steer loader 1. Therefore, in comparison with engine 11 and power transmission assembly 12 offset from each other in the fore-and-aft direction of skid steer loader 1, engine 11A and power transmission assembly 12A overlap each other in the fore-and-aft direction of skid steer loader 1, thereby advantageously minimizing chassis 2 of skid steer loader 1 in the fore-and-aft direction.

Figure 7:
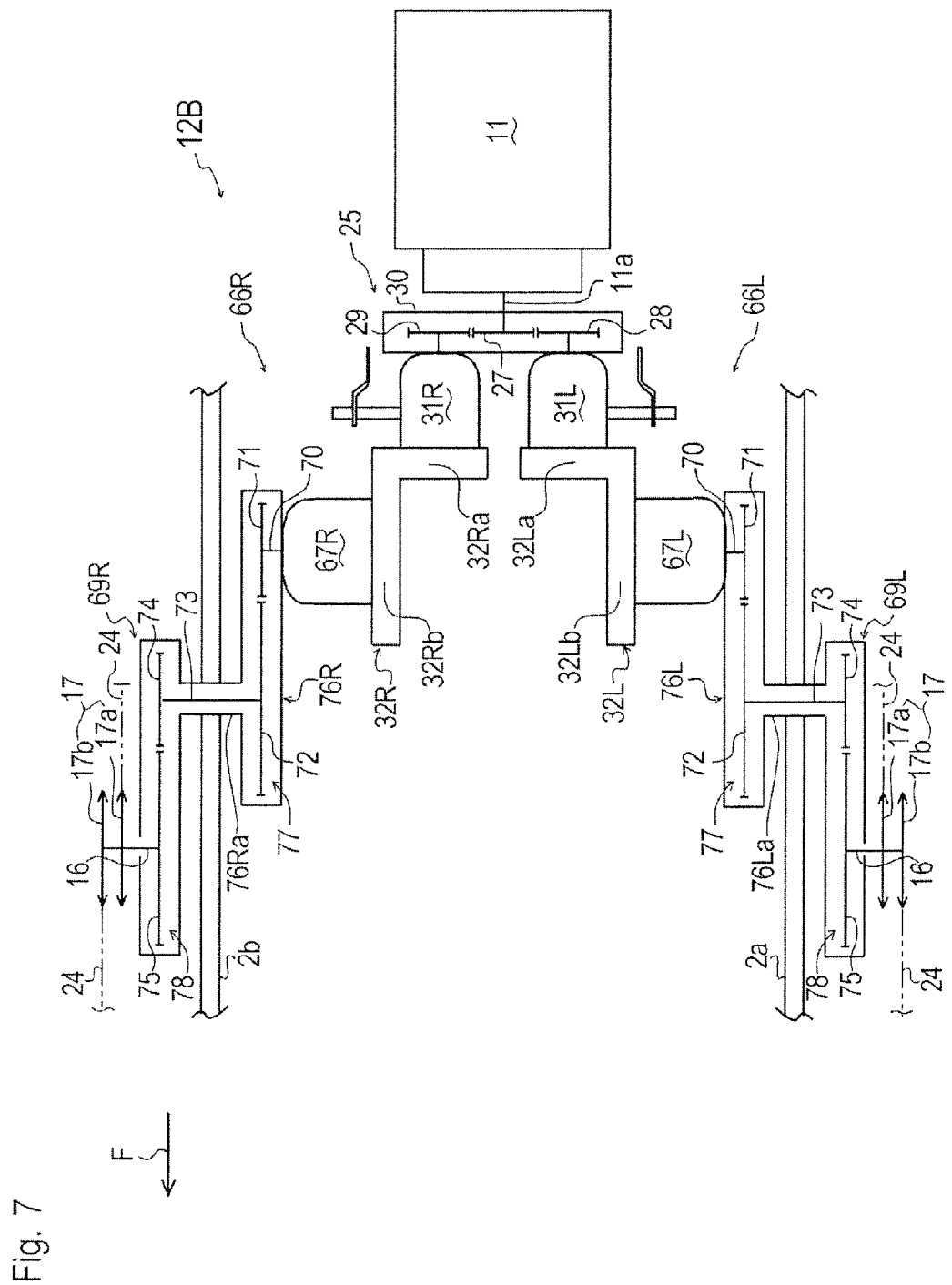
FIG. 7 is a schematic plan view of an alternative power transmission assembly 12B.

Referring to FIG. 7, an alternative power transmission assembly 12B will now be described. Power transmission assembly 12B includes power distribution unit 25 and alternative right and left transmission units 66R and 66L. Right and left transmission units 66R and 66L include respective hydraulic pumps 31R and 31L, respective center sections 32R and 32L, respective hydraulic motors 67R and 67L, and speed reduction units 69R and 69L. Center sections 32R and 32L are disposed forward from the right and left portions of power distribution unit 25, and hydraulic pumps 31R and 31L are mounted on the rear surfaces of lateral rear portions 32Ra and 32La of center sections 32R and 32L, similar to those of power transmission assembly 12. However, hydraulic motors 67R and 67L are mounted on distal side surfaces of fore-and-aft front portions 32Rb and 32Lb of right and left center sections 32R and 32L so as to be fluidly connected to respective hydraulic pumps 31R and 31L via the respective closed fluid circuits formed in respective center sections 32R and 32L, in comparison with hydraulic motors 33R and 33L mounted on proximal side surfaces of fore-and-aft front portions 32Rb and 32Lb of right and left center sections 32R and 32L. Speed reduction units 69R and 69L are disposed laterally distally from respective hydraulic motors 67R and 67L.

Each of hydraulic motors 67R and 67L includes a motor shaft 70 extended laterally distally therefrom. Each of speed reduction units 69R and 69L for transmitting power from respective motor shafts 70 to respective output shafts 16 includes a diametrically small gear 71, a diametrically large gear 72, an intermediate shaft 73, a diametrically small gear 74, and a diametrically large gear 75. Gear 71 is fixed on a distal end portion of motor shaft 70. Intermediate shaft 73 is laterally horizontally extended parallel to motor shaft 70. Gear 72 is fixed on a proximal end portion of intermediate shaft 73, and meshes with gear 71, so that gears 71 and 72 serve as a first reduction gear train 77. Gear 74 is fixed on a distal end portion of intermediate shaft 73. Gear 75 is fixed on a proximal end portion of output shaft 16, and meshes with gear 74, so that gears 74 and 75 serve as a second reduction gear train 78.

Speed reduction units 69R and 69L further include respective casings 76R and 76L each of which incorporates gears 71, 72, 74 and 75 and intermediate shaft 73. Right and left casings 76R and 76L include respective lateral portions 76Ra and 76La each of which is extended laterally horizontally so as to surround an axially intermediate portion of intermediate shaft 73. When viewed in plan, lateral portions 76Ra and 76La of right and left casings 76R and 76L cross respective right and left side frame portions 2a and 2b of chassis 2 extended in the fore-and-aft direction of skid steer loader 1. A proximal portion of each of casings 76R and 76L at proximal ends of respective lateral portions 76Ra and 76La is expanded along a proximal side of each of right and left side frame portions 2a and 2b so as to incorporate gears 71 and 72 serving as first reduction gear train 77. A distal portion of each of casings 76R and 76L at distal ends of respective lateral portions 76Ra and 76La is expanded along a distal side of each of right and left side frame portions 2a and 2b so as to incorporate gears 74 and 75 serving as second reduction gear train 78.

Lateral portions 76Ra and 76La of right and left casings 76R and 76L are fixed to respective right and left side frame portions 2a and 2b of chassis 2, so that right and left transmission units 66R and 66L are attached to right and left side frame portions 2a and 2b of chassis 2 via speed reduction units 69R and 69L. Therefore, power transmission assembly 12B is supported by chassis 2 via right and left speed reduction units 69R and 69L.

Figure 8:
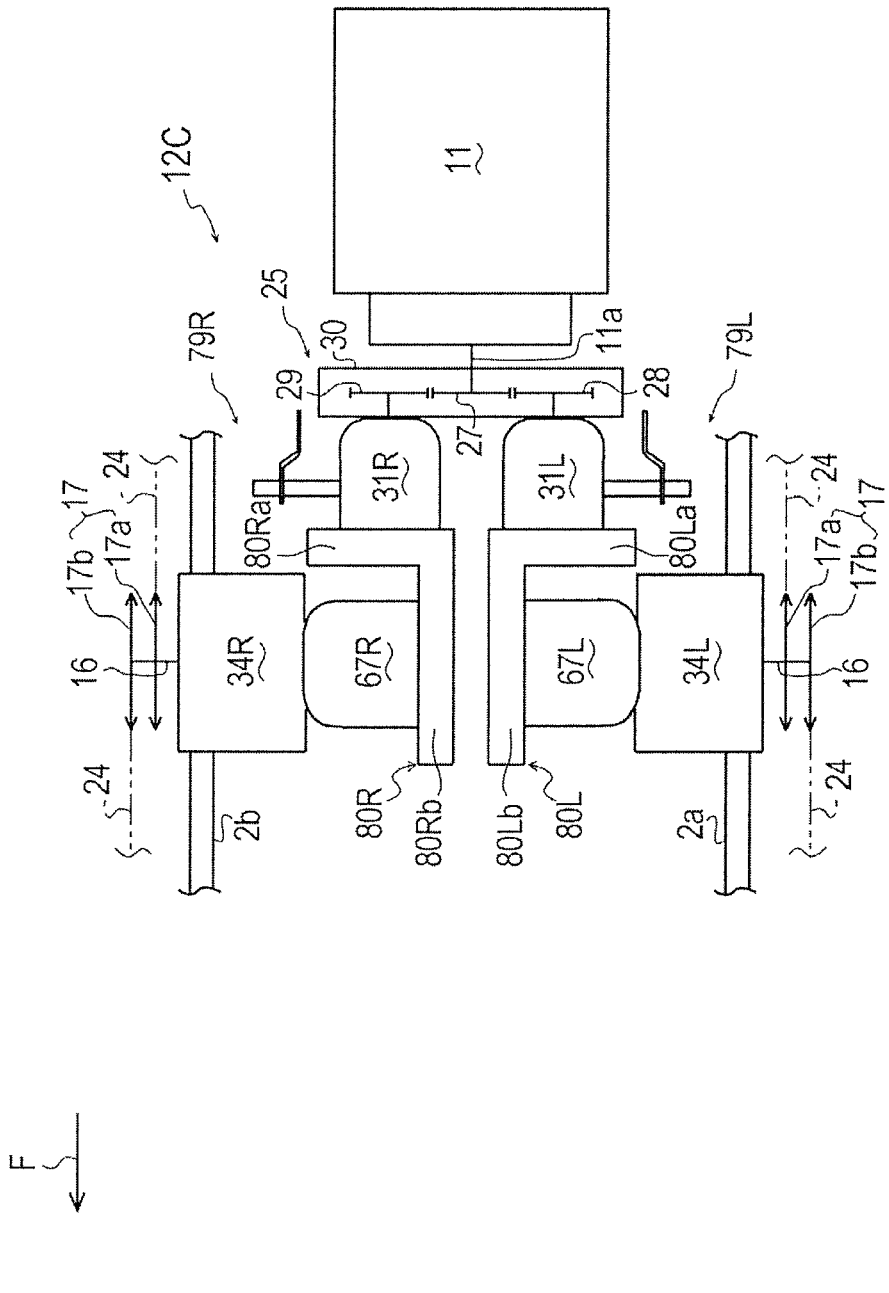
FIG. 8 is a schematic plan view of an alternative power transmission assembly 12C.

Referring to FIG. 8, an alternative power transmission assembly 12C will now be described. Power transmission assembly 12C includes power distribution unit 25 and alternative right and left transmission units 79R and 79L. Right and left transmission units 79R and 79L include respective hydraulic pumps 31R and 31L, respective center sections 80R and 80L, respective hydraulic motors 67R and 67L, and speed reduction units 34R and 34L.

Right and left symmetric center sections 80R and 80L correspond to laterally reversed center sections 32R and 32L. Therefore, center sections 80R and 80L include respective lateral rear portions 80Ra and 80La, and include respective fore-and-aft front portions 80Rb and 80Lb extended forward from proximal end portions of respective lateral rear portions 80Ra and 80La. More specifically, fore-and-aft front portion 80Rb of right center section 80R is extended forward from a left end portion of lateral rear portion 80Ra of right center section 80R, and fore-and-aft front portion 80Lb of center section 80L is extended forward from a right end portion of lateral rear portion 80La of left center section 80L.

Hydraulic pumps 31R and 31L are mounted on rear surfaces of lateral rear portions 80Ra and 80La of right and left center sections 80R and 80L so as to be interposed between lateral rear portions 80Ra and 80La of right and left center sections 80R and 80L and distribution casing 30 of power distribution unit 25 disposed rearward from right and left center sections 80R and 80L.

Hydraulic motors 67R and 67L are mounted on distal side surfaces of fore-and-aft front portions 80Rb and 80Lb of right and left center sections 80R and 80L so as to be interposed between fore-and-aft front portions 80Rb and 80Lb of right and left center sections 80R and 80L and respective speed reduction devices 34R and 34L disposed on respective distal sides of center sections 80R and 80L. Therefore, not only speed reduction devices 34R and 34L but also hydraulic motors 67R and 67L are disposed on respective distal sides of fore-and-aft front portions 80Rb and 80Lb of center sections 80R and 80L, thereby facilitating maintenance.

Figure 10:
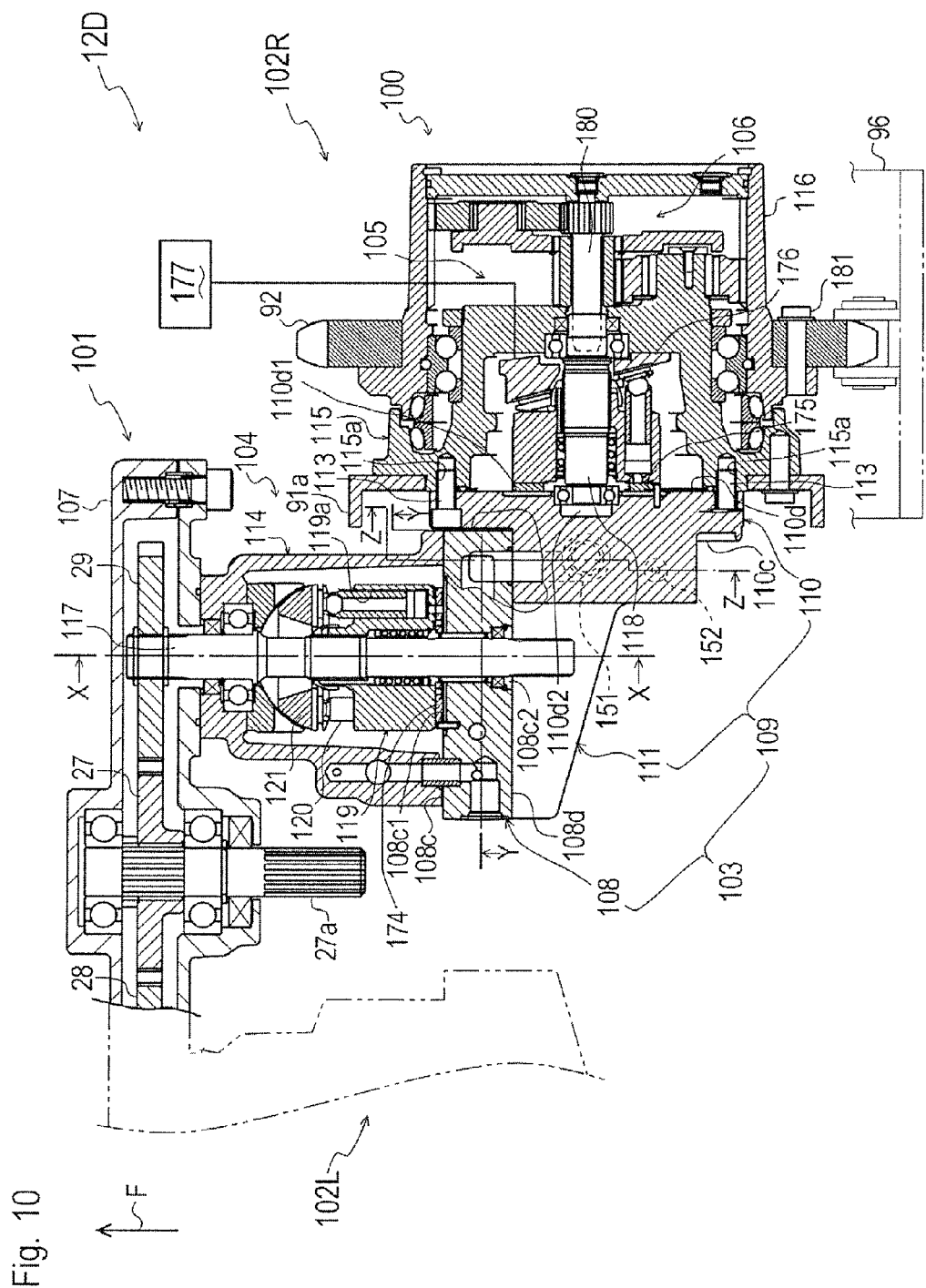
FIG. 10 is a schematic plan view of power transmission assembly 12D.

Referring to FIGS. 9 and 10, a track loader 90 equipped with an alternative power transmission assembly 12D will be described. Power transmission assembly 12D and engine 11 are aligned in the fore-and-aft direction of track loader 90 at a rear half portion of a chassis 91 of track loader 90, similar to power transmission assembly 12 and engine 11 in skid steer loader 1. Track loader 90 includes right and left crawler traveling devices 99 different from wheel type traveling devices 83 of skid steer loader 1. Right and left crawler traveling devices 99 are disposed below chassis 91 so as to support chassis 91.

Each crawler traveling device 99 includes a drive sprocket 92, a pair of front and rear driven wheels 93, rollers 94, a track frame 95 and a crawler belt 96. Front and rear driven wheels 93 and rollers 94 therebetween are carried by track frame 95 fixed to chassis 91. More specifically, axles 97 of front and rear driven wheels 93 are journalled at front and rear end portions of track frame 95, and axial shafts 98 of rollers 94 are journalled at a fore-and-aft intermediate portion of track frame 95 so as to be aligned in the fore-and-aft direction.

Drive sprocket 92 is disposed above track frame 95 so as to be drivingly connected to each of right and left transmission units 102R and 102L of power transmission assembly 12D as discussed later. Drive sprocket 92 and front and rear driven wheels 93 are arranged in a triangle when viewed in side, and rollers 94 are aligned along the horizontal bottom side of the triangle defined by drive sprocket 92 and driven wheels 93. Crawler belt 96 is looped over such arranged drive sprocket 92, front and rear driven wheels 93 and rollers 94.

Therefore, drive sprocket 92 of each of right and left crawler traveling devices 99 is driven by each of right and left transmission units 102R and 102L of power transmission assembly 12D so as to move crawler belt 96, and so as to rotate front and rear driven wheels 93 and rollers 94, thereby driving crawler traveling device 99.

Figure 13:
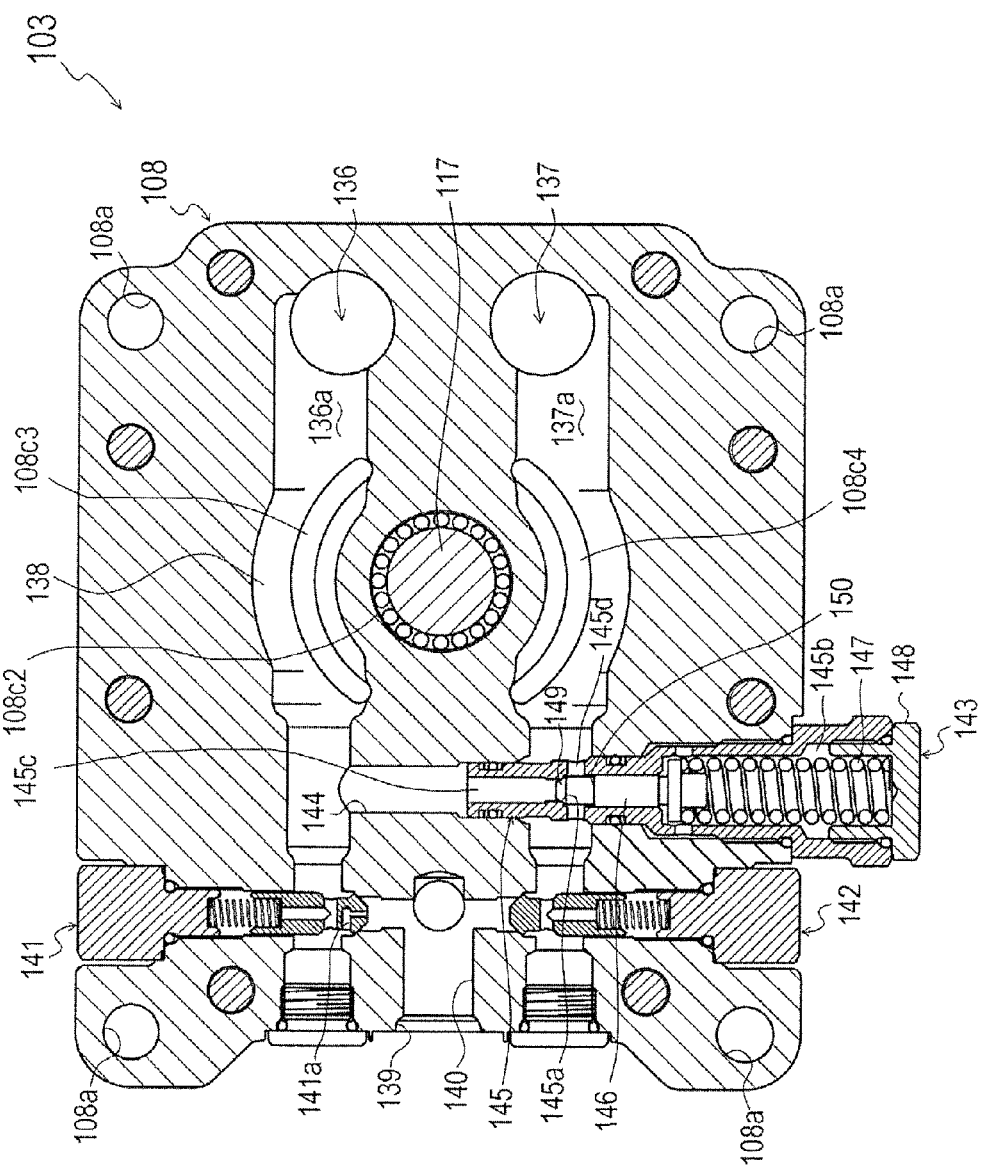
FIG. 13 is a cross sectional view of power transmission assembly 12D taken along Y-Y line of FIG. 10.
Figure 14:
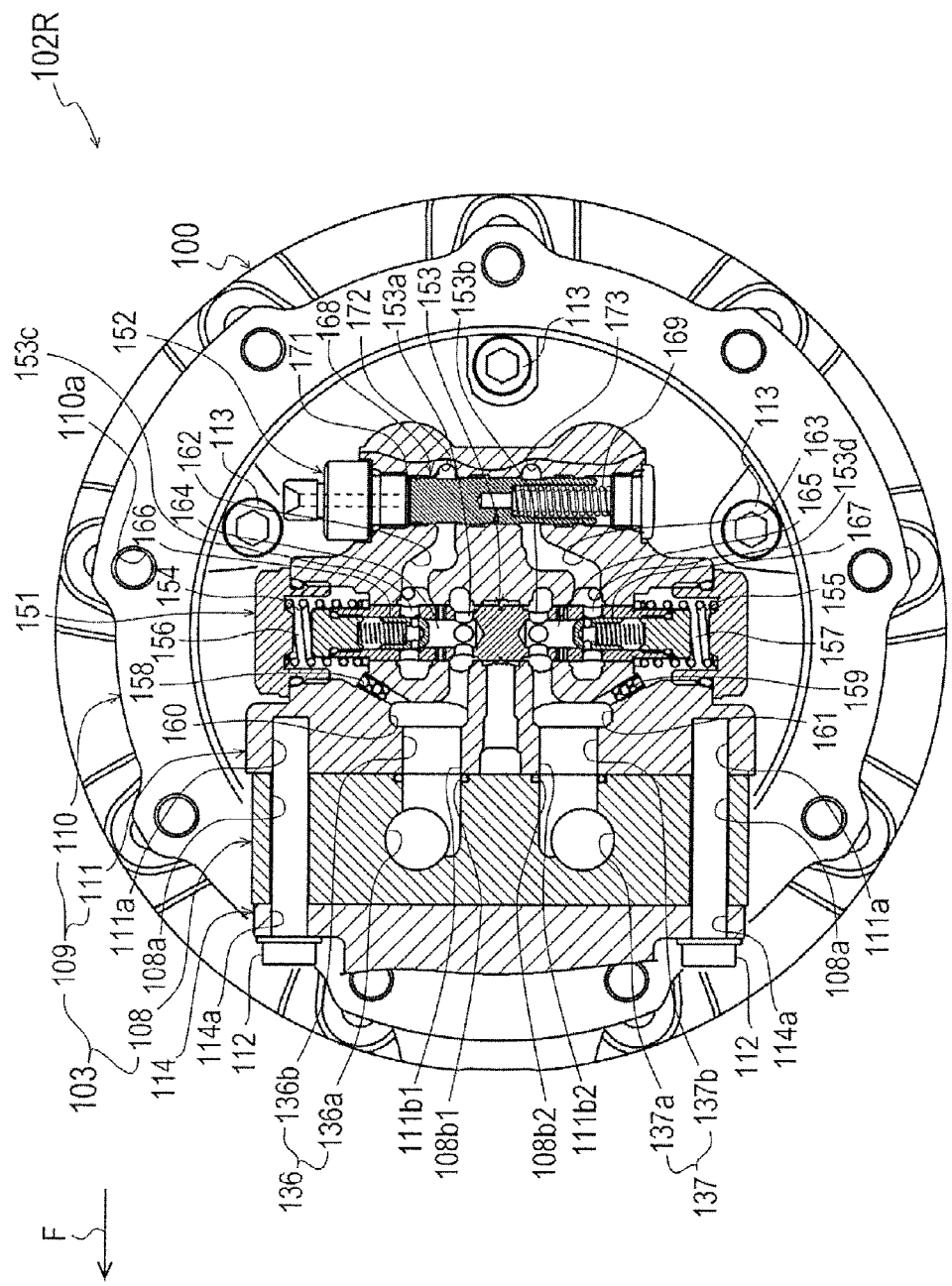
FIG. 14 is a cross sectional view of power transmission assembly 12D taken along Z-Z line of FIG. 10.
Figure 15:
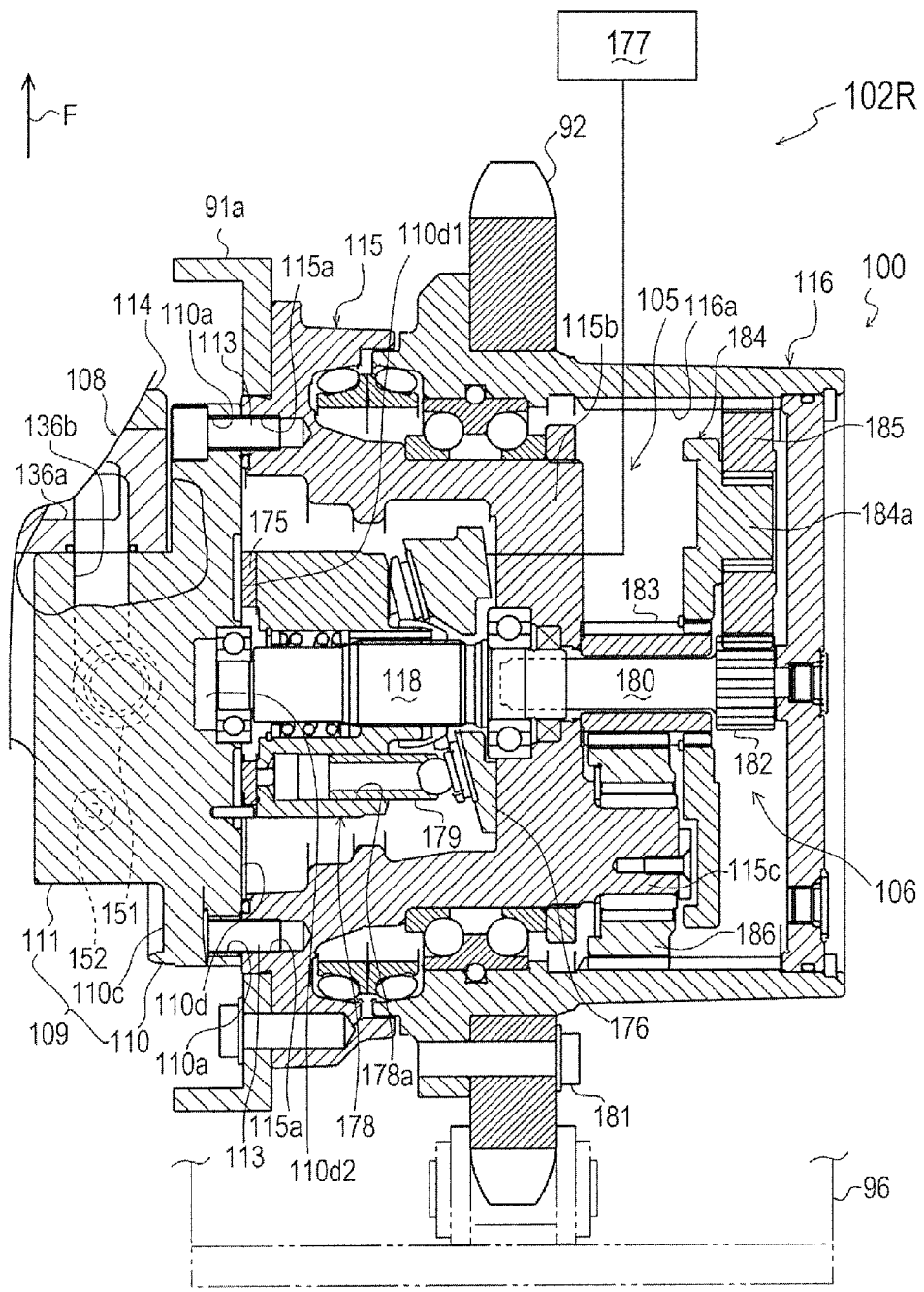
FIG. 15 is a sectional plan view of a motor unit 100 of power transmission assembly 12D.

Referring to FIGS. 9 to 15, power transmission assembly 12D will be described. Power transmission assembly 12D includes a power distribution unit 101 and right and left transmission units 102R and 102L. Power distribution unit 101 includes a distribution casing 107 and gears 27, 28 and 29 disposed in distribution casing 107, similar to gears 27, 28 and 29 in distribution casing 30. However, power distribution unit 101 is disposed rearward from engine 11. Right and left transmission units 102R and 102L are extended rearward from right and left portions of distribution casing 107 of power distribution unit 101. Right and left transmission units 102R and 102L are fixed to right and left side frame portions 91a of chassis 91, as understood from FIG. 15 illustrating only representative right transmission unit 102R fixed to representative right side frame portion 91a.

Distribution gear 27 is fixed on an input shaft 27a serving as a prime input shaft of power transmission assembly 12D. Input shaft 27a projects rearward from distribution casing 107 into a space between right and left transmission units 102R and 102L so as to be drivingly connected to engine output shaft 11a of engine 11 disposed rearward from power transmission assembly 12D as shown in FIG. 9. In this regard, engine output shaft 11a is extended in the fore-and-aft horizontal direction of track loader 90. Input shaft 27a is extended coaxially or parallel to engine output shaft 11a, so that input shaft 27a is drivingly connected to engine output shaft 11a via a spline sleeve or a propeller shaft with universal joints, for example.

Right and left input gears 28 and 29 meshing with distribution gear 27 therebetween are fixed on front ends of pump shafts 117 of right and left hydraulic pumps 104, pump shafts 117 serving as input shafts of right and left transmission units 1028 and 102L.

A configuration of each of right and left transmission units 102R and 102L will be described with reference to FIGS. 10 to 15 illustrating only representative right transmission unit 102R on the assumption that right and left transmission units 102R and 102L are laterally symmetric.

Each of right and left transmission units 102R and 102L includes a center section 103, a hydraulic pump 104, a hydraulic motor 105 and a speed reduction device 106. Hydraulic motor 105 and speed reduction device 106 constitute a motor unit 100 for driving drive sprocket 92. Hydraulic pump 104 and motor unit 100 are mounted onto center section 103, so that hydraulic pump 104 is fluidly connected to hydraulic motor 105 of motor unit 100 via a later-discussed closed fluid circuit 138 formed in center section 103, whereby hydraulic pump 104, hydraulic motor 105 and closed fluid circuit 138 constitute a hydrostatic stepless transmission (HST).

Variable displacement hydraulic pump 104 includes pump shaft 117, a cylinder block 119, plungers 120, a movable swash plate 121, and a pump casing 114. Cylinder block 119 is fixed on pump shaft 117 so that pump shaft 117 serves as a rotary axial shaft of cylinder block 119. Cylinder holes 119a parallel to pump shaft 117 are bored in cylinder block 119 and are aligned around pump shaft 117. Plungers 120 are reciprocally slidably fitted into respective cylinder holes 119a so as to constitute axial piston type hydraulic pump 104. Movable swash plate 121 abuts against heads of plungers 120 projecting outward from cylinder block 119. Pump casing 114 incorporates cylinder block 119, plungers 120 and movable swash plate 121, journals pump shaft 117 via a bearing, and supports movable swash plate 121 rotatably and slidably fitted thereto.

Variable displacement hydraulic motor 105 includes a motor shaft 118, a cylinder block 178, plungers 179, a movable swash plate 176, and a motor casing 115. Cylinder block 178 is fixed on motor shaft 118 so that motor shaft 118 serves as a rotary axial shaft of cylinder block 178. Cylinder holes 178a parallel to motor shaft 118 are bored in cylinder block 178 and are aligned around motor shaft 118. Plungers 179 are reciprocally fitted into respective cylinder holes 178a so as to constitute axial piston type hydraulic motor 105. Movable swash plate 176 abuts against heads of plungers 179 projecting outward from cylinder block 178. Motor casing 115 incorporates cylinder block 178, plungers 179 and movable swash plate 176, journals motor shaft 118 via a bearing, and supports movable swash plate 176 rotatably and slidably fitted thereto.

Center section 103 consists of a first divisional member 108 and a second divisional member 109 joined to each other. First divisional member 108 is a rectangular plate that is laterally extended so as to have a vertical front end surface 108c and a vertical rear end surface 108d. As best understood from FIG. 11, a circular pump port surface 108c1 is formed on front end surface 108c so as to have a central shaft hole 108c2 and a pair of kidney ports 108c3 and 108c4 open thereon. As best understood from FIGS. 12 and 13, upper and lower fluid ducts 136a and 137a are formed in first divisional member 108 so as to be joined to the respective kidney ports 108c3 and 108c4, and are open at rear end surface 108d so as to serve as upper and lower connection ports 108b1 and 108b2. Rectangular first divisional member 108 is bored through at four corner portions thereof with four bolt holes 108a extended in the fore-and-aft direction between front and rear end surfaces 108c and 108d.

Second divisional member 109 is formed with a discoid portion 110 and a laid U-shaped connection portion 111. Discoid portion 110 is extended vertically in the fore-and-aft direction so as to have laterally proximal and distal (i.e., right and left) vertical surfaces 110c and 110d, hereinafter referred to as "proximal end surface 110c" and "distal end surface 110d". As understood from FIGS. 10 and 15, a circular motor port surface 110d1 is formed on distal end surface 110d so as to have a central shaft bearing recess 110d2 and a pair of kidney ports (not shown) open thereon. Therefore, in right transmission unit 102R, a right end surface of discoid portion 110 is distal end surface 110d having motor port surface 110d1, and in left transmission unit 102L, a left end surface of discoid portion 110 is distal end surface 110d having motor port surface 110d1.

Connection portion 111 is formed with a vertical basal end portion 111e joined integrally to proximal end surface 110c of discoid portion 110, and is formed with upper and lower horizontal beam portions 111c and 111d extended laterally proximally from basal end portion 111e, so that connection portion 111 appears to be laid U-shaped when viewed in the fore-and-aft direction (along pump shaft 117). Therefore, in right transmission unit 102R, upper and lower horizontal beam portions 111c and 111 d are extended leftward from basal end portion 111e joined to left end surface 110c of discoid portion 110, and in left transmission unit 102L, upper and lower horizontal beam portions 111c and 111d are extended rightward from basal end portion 111e joined to right end surface 110c of discoid portion 110.

Basal end portion 111e is bored by upper and lower bolt holes 111a, and upper and lower beam portions 111c and 111d are bored at tip (laterally proximal) end portions thereof by respective bolt holes 111a. These four bolt holes 111a in connection portion 111 of second divisional member 109 are open forward so as to coincide to respective four bolt holes 108a of first divisional member 108.

The kidney ports open at motor port surface 110d1 on distal end surface 110d of discoid portion 110 are extended into connection portion 111. Upper and lower fluid ducts 136b and 137b are formed in connection portion 111 of second divisional member 109 so as to be joined to the respective kidney ports open at motor port surface 110d1, and are formed to have upper and lower open ends at a front end surface 111f of connection portion 111. These open ends of fluid ducts 136b and 137b serve as upper and lower connection ports 111b1 and 111b2, and match with respective upper and lower connection ports 108b1 and 108b2 of first divisional member 108 when first and second divisional members 108 and 109 are joined to each other.

To make center section 103, rear end surface 108d of first divisional member 108 and front end surface 111f of connection portion 111 of second divisional member 109 contact each other, so that upper and lower connection ports 108b1 and 108b2 match with respective upper and lower connection ports 111b1 and 111b2, and bolt holes 108a match with respective bolt holes 111a. Then, bolts 112 are inserted and screwed into respective bolt holes 111a through respective bolt holes 108a, thereby fastening first and second divisional members 108 and 109 so as to constitute center section 103.

As understood from FIG. 10, a front portion of discoid portion 110 of second divisional member 109 adjoins a distal end surface of first divisional member 108, so that first divisional member 108 and discoid portion 110 of second divisional member 109 are arranged in an L-like shape when viewed in plan. Strictly, in right center section 103, they are arranged in a laterally reversed L-shape, and in left center section 103, they are arranged in a correct L-shape.

In consideration that the area at which the front end portion of discoid portion 110 of second divisional member 109 and the distal end surface of first divisional member 108 adjoin each other is small, front end surface 111f of connection portion 111 of second divisional member 109 has a sufficiently large area contacting rear end surface 108d of first divisional member 108. Further, upper and lower beam portions 111c and 111d are expanded trapezoidal toward basal end portion 111e when viewed in plan. Therefore, connection portion 111 of second divisional member 109 sufficiently strengthens the joint of first divisional member 108 having pump port surface 108c1 to discoid portion 110 of second divisional member 109 having motor port surface 110d1. In other words, connection portion 111 ensures the strength of center section 103 for supporting hydraulic pump 104 and motor unit 100 attached to center section 103.

Figure 12:
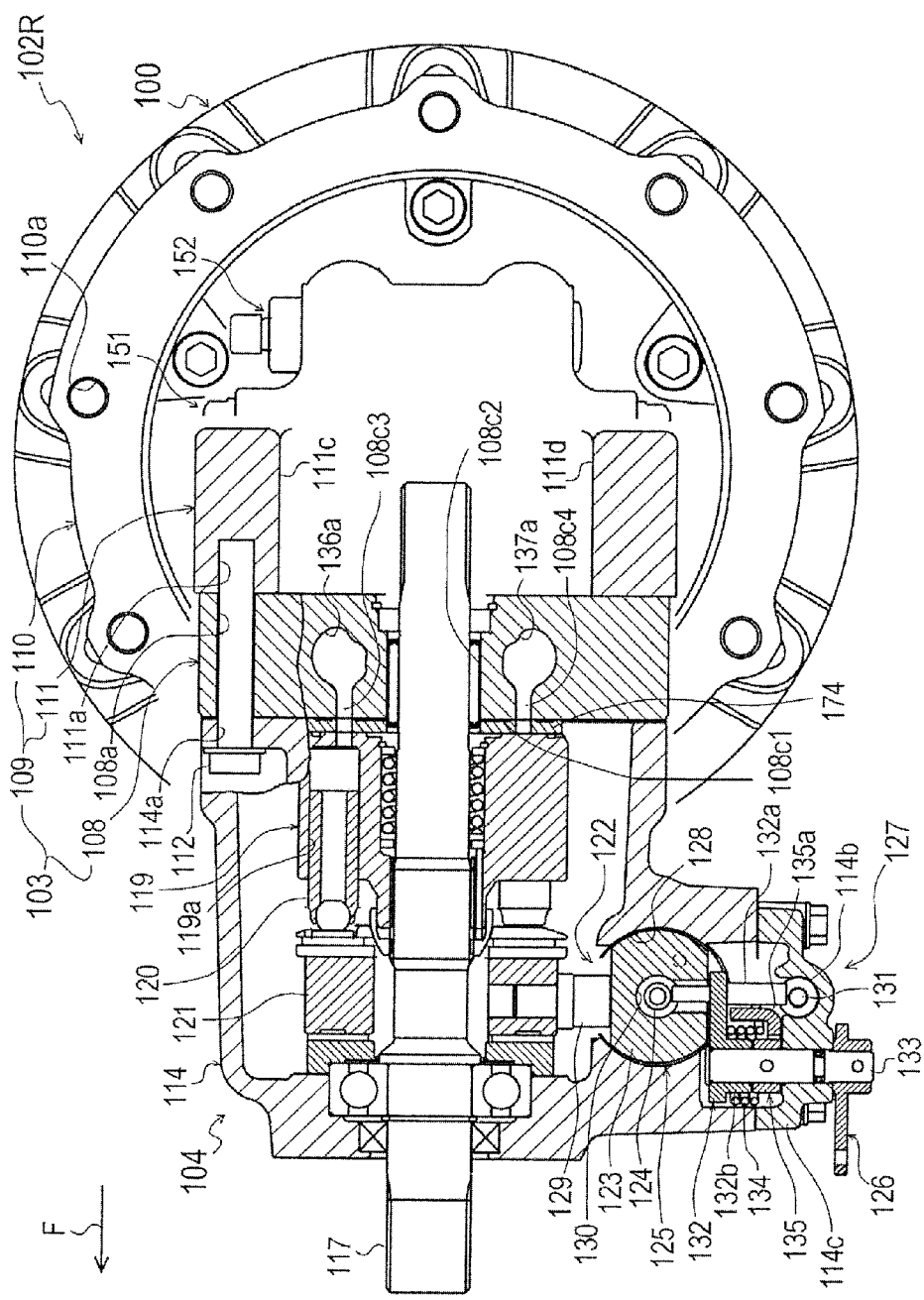
FIG. 12 is a cross sectional view of power transmission assembly 12D taken along X-X line of FIG. 10.

Referring to FIG. 12, pump casing 114 is formed with bolt holes 114a corresponding to respective bolt holes 108a in first divisional member 108 of center section 103. Bolts 112 are also passed through respective bolt holes 114a so as to fasten pump casing 114 of hydraulic pump 104 to center section 103. In this regard, front end surface 108c of first divisional member 108 also serves as most front end surface 108c of center section 103 (hereinafter, referred to as "front end surface 108c of center section 103"). Cylinder block 119 of hydraulic pump 104 is mounted onto pump port surface 108c1 on front end surface 108c of center section 103 via a valve plate 174. Pump shaft 117 is extended rearward from distribution casing 107 so as to serve as the rotary axial shaft of cylinder block 119, and is inserted into shaft hole 108c2 in first divisional member 108 of center section 103.

In the above-mentioned condition that rear end surface 108d of first divisional member 108 and front end surface 111f of connection portion 111 of second divisional member 109 contact each other, and cylinder block 119 is mounted on first divisional member 108, pump casing 114 of hydraulic pump 104 is disposed between distribution casing 107 and front end surface 108c of center section 103 so as to contact front end surface 108c of center section 103 at a rear end thereof, so that bolt holes 114a match with bolt holes 108a open at front end surface 108c of center section 103. Accordingly, movable swash plate 121 supported by pump casing 114, plungers 120 abutting against movable swash plate 121, and cylinder block 119 having plungers 120 are located, and pump casing 114 and first and second divisional members 108 and 109 are located to journal pump shaft 117.

Then, bolts 112 are screwed rearwardly into bolt holes 111a of second divisional member 109 through bolt holes 114a of pump casing 114 and bolt holes 108a of first divisional member 108 so as to fasten first divisional member 108 together with pump casing 114 to second divisional member 109. Therefore, the screwing of bolts 112 completes fastening pump casing 114 to center section 103, i.e., mounting of hydraulic pump 104 to center section 103, simultaneously with joining first and second divisional members 108 and 109 to complete center section 103.

Motor unit 100 includes a sprocket axial casing 116. Sprocket axial casing 116 is relatively rotatably fitted to motor casing 115 of hydraulic motor 105 so as to incorporate hydraulic motor 105 and so as to incorporate speed reduction device 106 disposed in a space between motor casing 115 and sprocket axial casing 116. Sprocket axial casing 116 also serves as an output member of speed reduction device 106, and drive sprocket 92 is fastened onto sprocket axial casing 116 via bolts 181, so that sprocket axial casing 116 is fixedly provided on an outer peripheral surface thereof with drive sprocket 92, thereby serving as a rotary axial core member of drive sprocket 92 for driving crawler traveling device 99.

Referring to FIGS. 10 and 15, distal end surface 110d of discoid portion 110 of second divisional member 109 having motor port surface 110d1 also serves as most distal end surface 110d of center section 103 (hereinafter referred to as "distal end surface 110d of center section 103"). Cylinder block 178 of hydraulic motor 105 is mounted on motor port surface 110d1 on distal end surface 110d of center section 103 via a valve plate 175. A proximal end portion of motor shaft 118 extended from cylinder block 178 is journalled in shaft bearing recess 110d2 by discoid portion 110 of center section 103 via a bearing.

Figure 11:
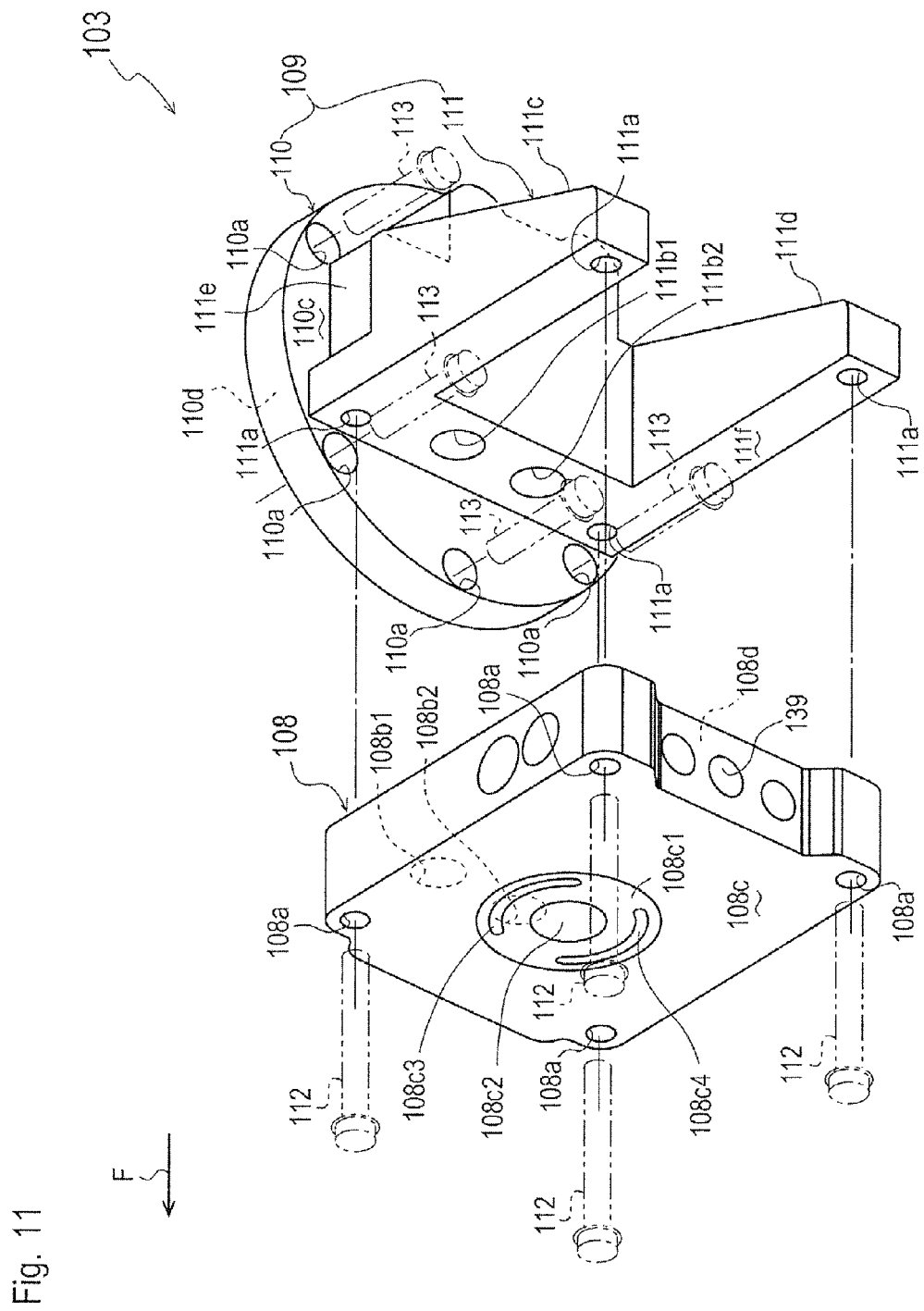
FIG. 11 is a perspective view of a disassembled center section.

As shown in FIG. 11, discoid portion 110 is bored by bolt holes 110a aligned along a circular edge of discoid portion 110, and motor casing 115 is bored by bolt holes 115a coinciding to respective bolt holes 110a. Motor casing 115 of motor unit 100 supporting movable swash plate 176 is fitted at a proximal end thereof onto distal end surface 110d of center section 103 so that bolt holes 115a match with bolt holes 110a, while fitting cylinder block 178 onto motor port surface 110d1, and journaling the proximal end of motor shaft 118 in shaft bearing recess 110d2. Then, bolts 113 are screwed into bolt holes 110a of discoid portion 110 of center section 103 through respective bolt holes 115a of motor casing 115 so as to fasten motor casing 115 to center section 103, thereby cantilevering motor unit 100 laterally distally from distal end surface 110d of center section 103.

Due to the above-mentioned joint of connection ports 108b1 and 108b2 to respective connection ports 111b1 and 111b2 when joining first divisional member 108 to second divisional member 109, upper fluid duct 136a in first divisional member 108 and upper fluid duct 136b in second divisional member 109 are joined continuously to each other so as to constitute an upper main fluid passage 136 for fluidly connecting kidney port 108c3 to one of the kidney ports open at motor port surface 110d1, and lower fluid duct 137a in first divisional member 108 and lower fluid duct 137b in second divisional member 109 are joined continuously to each other so as to constitute a lower main fluid passage 137 for fluidly connecting kidney port 108c4 to the other of the kidney ports open at motor port surface 110d1.

Therefore, main fluid passages 136 and 137 formed in center section 103 serve as closed fluid circuit 138 fluidly connecting cylinder holes 119a in cylinder block 119 of hydraulic pump 104 mounted on pump port surface 108c1 to cylinder holes 178a in cylinder block 178 of hydraulic motor 105 mounted on motor port surface 110d1. Therefore, as mentioned above, center section 103, and hydraulic pump 104 and hydraulic motor 105 mounted on center section 103 constitute the HST.

Referring to FIG. 12, hydraulic pump 104 is provided therebelow with a hydraulic servo mechanism 122 for controlling the tilt angle and direction of movable swash plate 121. Hydraulic servo mechanism 122 includes a swash plate control valve 125 provided in a wall of pump casing 114. Swash plate control valve 125 is operatively connected to a manually operable speed control lever 126. Swash plate control valve 125 includes a piston 123 and a spool 124. Piston 123 is slidably fitted in a cylinder 128 formed in a wall of pump casing 114 adjacent to movable swash plate 121. Spool 124 is slidably fitted in an axial hole 130 formed through piston 123. A connection pin 129 projects from movable swash plate 121 and is connected to a proximal end of piston 123 so as to operatively connect piston 123 to movable swash plate 121.

Piston 123 divides the inner space of cylinder 128 into right and left fluid chambers. Piston 123 is formed with fluid ducts each of which is fluidly connected to the right or left fluid chamber. By sliding spool 124, each of the fluid ducts in piston 123 is closed or opened so as to cause a difference in pressure between opposite ends of piston 123, thereby sliding piston 123 so as to rotate movable swash plate 121 via connection pin 129.

Pump casing 114 is downwardly open at a front bottom portion below swash plate control valve 125, and a cover 114c is attached upward to the front bottom portion of pump casing 114 so as to cover the downward opening of pump casing 114. Cover 114c and the front bottom portion of pump casing 114 define a space therein. A neutral biasing mechanism 127 for holding speed control lever 126 at its neutral position corresponding to a neutral position of movable swash plate 121, when speed control lever 126 is free from a manipulation force, is disposed in this space. Therefore, this space is referred to as a "neutral biasing chamber".

Neutral biasing mechanism 127 includes a detent rod 131, a spool control arm 132, a pivot shaft 133, a spring 134, and an arm 135. In this regard, cover 114c is formed with a laterally extended recess 114b at the bottom of the neutral biasing chamber. Detent rod 131 is extended laterally and its lower half portion is axially slidably fitted into recess 114b. An unshown adjusting bolt (or the like) is screwed in pump casing 114 so as to determine the axial position of detent rod 131. More specifically, an axially intermediate portion of detent rod 131 is formed with an annular detent groove. The axial positioning of detent rod 131 by screwing the adjusting bolt is performed to determine the position of the detent groove.

Pivot shaft 133 is extended vertically and is journalled by cover 114c. A bottom end of pivot shaft 133 projects downward from cover 114c, and is fixedly provided thereon with speed control lever 125. A top portion of pivot shaft 133 is disposed in the neutral biasing chamber. In the neutral biasing chamber, spool control arm 132 is provided on the top portion of pivot shaft 133. In this regard, spool control arm 132 is formed at a basal end thereof with a boss 132b, which is fitted on the top portion of pivot shaft 133 so as to allow spool control arm 132 to rotate relative to pivot shaft 133.

A vertical connection rod 132a is extended upward and downward from a tip portion of spool control arm 132. Piston 123 is bored by a vertical hole extended downward from axial hole 130 of piston 123 having spool 124 therein. The upper portion of connection rod 132a extended upward from the tip portion of spool control arm 132 is passed through the vertical hole of piston 123, and a top end of connection rod 132a is engaged to spool 124 in axial hole 130 of piston 123. In this regard, the vertical hole of piston 123 has a sufficient diameter to allow the movement of connection rod 132a according to rotation of spool control arm 132 while holding piston 123. On the other hand, the lower portion of connection rod 132a extended downward from the tip portion of spool control arm 132 is fitted at a bottom end thereof into the detent groove of detent rod 131. Therefore, the above-mentioned axial position of the detent groove of detent rod 131 determined by the adjusting bolt or the like defines a position of spool 124 corresponding to the neutral position of movable swash plate 121.

In the neutral biasing chamber, arm 135 is fixed at a boss portion thereof onto an axial intermediate portion of pivot shaft 133 below boss 132b of spool control arm 132 and is bent upward at a tip portion thereof so as to form an engaging portion 135a. Spring 134 is wound around boss 132b of spool control arm 132. Both end portions of spring 134 are twisted to cross each other, and are extended to clamp connection rod 132a and engaging portion 135a therebetween. In other words, the both end portions of spring 134 bias connection rod 132a of spool control arm 132 and engaging portion 135a of arm 135 toward each other.

Due to the biasing force of spring 134, arm 135 tends to rotate so as to have engaging portion 135a approaching connection rod 132a when speed control lever 126 is free from a manipulation force. On the other hand, as far as spool 124 stays at a position defined by the detent groove of detent rod 131, connection rod 132a is held at the position.

Once speed control lever 126 is manipulated to rotate from its neutral position, engaging portion 135a of arm 135 pushes or pulls corresponding one of the both end portions of spring 134 so as to increase the distance between connection rod 132a and engaging portion 135a, however, the biasing force of spring 134 applied onto connection rod 132a toward engaging portion 135a is increased so that connection rod 132a moves to approach engaging portion 135a, thereby moving spool 124 together with detent rod 131 from its neutral position to another position, and thereby finally moving piston 123 together with movable swash plate 121 to a position defined by the position of speed control lever 126.

When speed control lever 126 having been rotated from its neutral position is released from the manipulation force, due to the biasing force of spring 134, speed control lever 126 tends to return together with arm 135 toward its neutral position, and then, connection rod 132a tends to approach engaging portion 135a of arm 135, whereby spool control arm 132 and spool 124 return to their initial position, and then piston 123 and movable swash plate 121 return to their neutral position.

Referring to FIG. 13, first divisional member 108 of center section 103 is provided with a fluid charge system for charging fluid to closed fluid circuit 138 and with a pressure adjusting system for adjusting pressure of fluid in closed fluid circuit 138.

In the fluid charge system, first divisional member 108 of center section 103 is formed therein with a charge fluid duct 140 whose end is open at a proximal end surface of first divisional member 108 so as to serve as a suction port 139 for receiving fluid delivered from an unshown charge pump. Charge fluid duct 140 is extended in first divisional member 108 parallel to upper and lower fluid ducts 136a and 137a. Upper and lower charge check valves 141 and 142 are fitted into first divisional member 108 so as to be interposed between charge fluid duct 140 and respective fluid ducts 136a and 137a. Charge check valve 141 is provided with an orifice 141a that bypasses charge check valve 141 so as to expand the neutral zone of hydraulic pump 104.

In the pressure adjusting system, a vertical relief duct 144 is formed in first divisional member 108 between upper and lower charge check valves 141 and 142 and upper and lower kidney ports 108c3 and 108c4 so as to extend downward from upper fluid duct 136a to a bottom end surface of first divisional member 108 through lower fluid duct 136b. In vertical relief duct 144, a bypass relief valve 143 is configured so as to include a valve holder 145, a valve member 146, a spring 147 and a spring retainer 148.

Valve holder 145 is fitted upward into vertical relief duct 144 via the bottom end of vertical relief duct 144 open at the bottom end surface of first divisional member 108. Valve holder 145 is formed with a vertical axial fluid hole therethrough. A top end of valve holder 145 is disposed at a position in vertical relief duct 144 between upper and lower fluid ducts 136a and 137a, and a top end of the vertical axial hole in valve holder 145 is open upward at the top end of valve holder 145 toward upper fluid duct 136a. In a junction portion of vertical relief duct 144 to lower fluid duct 137a, valve holder 145 is formed at a vertically intermediate portion thereof with a horizontal radial hole that is extended radially from the vertical axial hole so as to open to lower fluid duct 137a.

An inner peripheral surface of valve holder 145 defining the vertical axial hole in valve holder 145 is tapered so as to form a valve seat 145a immediately above the horizontal radial hole. The upper portion of the vertical axial hole in valve holder 145 extended upward from valve seat 145a is defined as an upper port 145c open to upper fluid duct 136a, and the horizontal radial hole formed in valve holder 145 immediately below valve seat 145a is defined as a lower port 145d open to lower fluid duct 136b.

Columnar valve member 146 is fitted in the vertical axial hole in valve holder 145. A top surface of valve member 146 is tapered so as to serve as a first pressure receiving surface 149 that receives a pressure of fluid from upper fluid duct 136a into upper port 145c via the top end of valve holder 145. Below lower port 145d, valve member 146 is stepped to have an annular horizontal surface serving as a second pressure receiving surface 150. In this regard, an outer peripheral surface of a lower portion of valve member 146 extended downward from second pressure receiving surface 150 is tightly fitted to the inner peripheral surface of vertical relief duct 144, and an outer peripheral surface of an upper portion of valve member 146 extended upward from second pressure receiving surface 150 faces lower port 145d and is spaced from the inner peripheral surface of vertical relief duct 144, so that the pressure of fluid introduced from lower fluid duct 137a into vertical relief duct 144 via lower port 145d is applied downward to second pressure receiving surface 150.

When the top surface of valve member 146 serving as first pressure receiving surface 149 is fitted to valve seat 145a, valve member 146 isolates upper port 145c and lower port 145d from each other, thereby isolating upper and lower fluid ducts 136a and 137a (i.e., upper and lower fluid passages 136 and 137) from each other. Therefore, bypass relief valve 143 is closed by fitting valve member 146 to valve seat 145a.

A lower portion of the vertical axial hole in valve holder 145 is diametrically expanded so as to serve as a spring chamber 145b accommodating a bottom portion of valve member 146 and spring 147 below valve member 146. Spring retainer 148 is attached to a bottom end of valve holder 145 so as to cover a bottom end of the vertical axial hole in valve holder 145 and so as to retain a bottom end of spring 147. Spring 147 biases valve member 146 upward so that first pressure receiving surface 149 of valve member 146 is normally fitted to valve seat 145a, i.e., bypass relief valve 143 is normally closed to isolate upper and lower fluid ducts 136a and 137a from each other.

If a hydraulic pressure of either upper or lower fluid duct 136a or 137a is going to exceed a relief pressure defined by the force of spring 147, the surplus pressure of fluid is applied onto first or second pressure receiving surface 149 or 150 so as to press valve member 146 downward against spring 147, so that the top portion of valve member 146 serving as first pressure receiving surface 149 is separated from valve seat 145a, thereby fluidly connecting upper port 145c and lower port 145d to each other. In this way, by separating valve member 146 from valve seat 145a, bypass relief valve 143 is opened so as to bypass fluid between upper and lower fluid duct 136a and 137a, i.e., between main fluid passages 136 and 137.

Spring retainer 148 is screwed into valve holder 145. Therefore, spring retainer 148 is rotatable to adjust its vertical position so as to adjust a vertical length of spring 147, thereby adjusting an initial force of spring 147 to upwardly bias valve member 146. Further, the rotation of spring retainer 148 for changing the vertical position of spring retainer 148 changes the vertical length of spring chamber 145b.

In this regard, if the vertical length of spring chamber 145b determined by rotating spring retainer 148 is less than a free length of spring 147, spring 147 is compressed so as to bias valve member 146 upward. Therefore, bypass relief valve 143 is normally closed, and is opened to bypass fluid between main fluid passages 136 and 137 when a surge pressure exceeding the relief pressure is going to occur, so that bypass relief valve 143 serves as a relief valve for suppressing a surge pressure in closed fluid circuit 138.

On the contrary, if the vertical length of spring chamber 145b exceeds the free length of spring 147, the initial position of valve member 146 is lowered so that the top surface of valve member 146 serving as first pressure receiving surface 149 is constantly separated from valve seat 145a, i.e., bypass relief valve 143 is constantly open to bypass fluid between main fluid passages 136 and 137 regardless of variation of hydraulic pressure in upper and lower fluid ducts 136a and 137a. Such constantly open bypass relief valve 143 can be used to release drive sprockets 92 from resistances of hydraulic pressures in closed fluid circuits 138 when track loader 90 is towed.

In this way, due to rotation of spring retainer 148, bypass relief valve 143 can be used to function as either the relief valve for suppressing a surge pressure in closed fluid circuit 138 or the bypass valve for releasing drive sprocket 92 from hydraulic pressure resistance in closed fluid circuit 138.

Referring to FIG. 15, variable displacement hydraulic motor 105 is provided with movable swash plate 176 operatively connected to a swash plate control mechanism 177 for shifting movable swash plate 176 between a high speed position for setting hydraulic motor 105 to have a small displacement and a low speed position for setting hydraulic motor 105 to have a large displacement. Swash plate control mechanism 177 includes a hydraulically controlled actuator for moving movable swash plate 176, and a pilot pressure fluid circuit for controlling the actuator.

Referring to FIG. 14, second divisional member 109 of center section 103 is provided therein with a counter balance valve 151 and a speed shift valve 152. Counter valance valve 151 reduces shocks caused when track loader 90 starts or stops running. Speed shift valve 152 is used to supply a pilot pressure fluid to the pilot pressure fluid circuit in swash plate control mechanism 177 for the high-and-low output speed shift of hydraulic motor 105.

Counter balance valve 151 includes a vertical piston 153 and upper and lower springs 154 and 155. In this regard, second divisional member 109 is formed with upper and lower fluid chambers 156 and 157, and with a vertical valve hole extended between upper and lower fluid chambers 156 and 157. Piston 153 is vertically slidably fitted in the vertical valve hole in second divisional member 109. Upper and lower springs 154 and 155 are fitted in respective upper and lower fluid chambers 156 and 157 so as to bias piston 153 therebetween toward a neutral position. Further, upper and lower orifices 158 and 159 are formed in second divisional member 109 so as to fluidly connect respective upper and lower fluid chambers 156 and 157 to respective upper and lower fluid ducts 136b and 137b.

Piston 153 is formed with upper and lower radial ports 153a and 153b, which are open to respective upper and lower connection ports 111b1 and 111b2 of respective upper and lower fluid ducts 136b and 137b when piston 153 is disposed at its neutral position. Piston 153 is formed with an upper radial port 153c above upper radial port 153a, and with a lower radial port 153d below lower radial port 153b. Second divisional member 109 is formed therein with upper and lower fluid ducts 162 and 163 to which respective upper and lower radial ports 153c and 153d are open when piston 153 is disposed at its neutral position.

An upper axial fluid duct 164 is formed in an upper portion of piston 153 so as to connect upper radial port 153a to upper radial port 153c. A lower axial fluid duct 165 is formed in a lower portion of piston 153 so as to connect lower radial port 153b to lower radial port 153d. Upper and lower check valves 166 and 167 with respective springs are vertically slidably fitted in respective upper and lower fluid ducts 164 and 165, and are biased by the respective springs so as to initially isolate respective upper and lower radial ports 153c and 153d from respective upper and lower radial ports 153a and 153b.

Another vertical valve hole is formed in second divisional member 109 so as to cross upper and lower fluid ducts 162 and 163 downstream of counter balance valve 151, and speed shift valve 152 is configured in this vertical valve hole. Speed shift valve 152 includes a vertical piston 168 and a spring 169. Piston 168 is fitted vertically slidably in the vertical valve hole, and an upper portion of the vertical valve hole above piston 168 serves as a pilot pressure fluid chamber 171. Spring 169 is disposed below piston 168 in the vertical valve hole so as to bias piston 168 upward toward pilot pressure fluid chamber 171. Pilot pressure fluid chamber 171 is fluidly connected to an unshown pilot pressure fluid passage formed in second divisional member 109.

Piston 168 is formed on an outer peripheral surface thereof with upper and lower annular grooves (not shown). Second divisional member 109 is formed therein with upper and lower fluid ducts 172 and 173 connected to the respective kidney ports open at motor port surface 110d1. The vertical position of piston 168 is shiftable according to changing the pilot pressure of fluid in pilot pressure fluid chamber 171 against spring 169. Normally, the annular grooves of piston 168 fluidly connect respective upper and lower fluid ducts 162 and 163 to respective upper and lower fluid ducts 172 and 173. Speed shift valve 152 supplies fluid from pilot pressure fluid chamber 171 to the pilot pressure fluid circuit of swash plate control mechanism 177, and the pilot pressure of fluid supplied to the pilot pressure fluid circuit of swash plate control mechanism 177 is controlled by speed shift valve 152 so as to select whether movable swash plate 176 is disposed at the high speed position or the low speed position.

For example, it is assumed that upper kidney port 108c3 serves as a suction port of hydraulic pump 104, and lower kidney port 108c4 serves as a delivery port of hydraulic pump 104. Fluid delivered from delivery kidney port 108c4 of hydraulic pump 104 flows into lower connection port 111b2 and lower fluid duct 161. A part of fluid in fluid duct 161 is introduced into lower fluid chamber 157 via orifice 159, and the remaining fluid in fluid duct 161 flows into lower axial fluid duct 165 via lower radial port 153b so as to press lower check valve 167 downward against the spring of check valve 167, i.e., so as to open lower check valve 167, thereby fluidly connecting axial fluid duct 165 to radial port 153d and fluid duct 163. Fluid in fluid duct 163 is supplied to cylinder holes 178a in cylinder block 178 of hydraulic motor 105 for driving plungers 179 via speed shift valve 152, fluid duct 173 and one of the kidney ports open on motor port surface 110d1.

The fluid introduced into lower fluid chamber 157 raises piston 153 against upper spring 154, so that upper radial port 153a fluidly connects upper fluid ducts 160 and 162 to each other. Therefore, fluid in cylinder holes 178a is delivered from the other of the kidney ports open on motor port surface 110d1 to upper connection port 111b1 via upper fluid ducts 160, 162 and 172, speed shift valve 152, and radial port 153a of piston 153 of counter balance valve 151. Fluid in upper connection port 111b1 flows into upper suction kidney port 108c3 of hydraulic pump 104 via upper connection port 108b1 and upper fluid duct 136a.

During the above-mentioned circulation of fluid in closed fluid circuit 138, lower charge check valve 142 is closed, and the vertical position of piston 168 is controlled so as to control the pilot pressure of fluid supplied from speed shift valve 152 to the pilot pressure fluid circuit of swash plate speed control mechanism 177, thereby controlling the tile angle of movable swash plate 176, i.e., the output speed of hydraulic motor 105.

While the above-mentioned circulation of fluid, if the fluid delivery from hydraulic pump 104 to hydraulic motor 105 is suddenly stopped, the fluid supply to lower axial fluid duct 165 in piston 153 is stopped so that check valve 167 rises to be closed, and the pressure of fluid in lower fluid chamber 157 is reduced so that piston 153 returns to its neutral position defined by the biasing forces of springs 154 and 155.

After stopping the fluid delivery, hydraulic motor 105 still rotates inertially. In this state, counter balance valve 151 having piston 153 at the neutral position isolates upper and lower fluid ducts 162 and 163 from upper and lower connection ports 111b1 and 111b2. Accordingly, the hydraulic pressure in upper fluid ducts 162 and 172 fluidly connected to the delivery port of hydraulic motor 105 increases, and lower fluid ducts 163 and 173 fluidly connected to the suction port of hydraulic motor 105 is hydraulically depressed. The hydraulic depression of fluid ducts 163 and 173 causes a differential pressure between fluid ducts 163 and 173 and the pilot pressure fluid circuit of swash plate control mechanism 177. If the differential pressure is going to exceed a threshold value, the pilot pressure fluid in the pilot pressure fluid circuit is introduced into the hydraulically depressed fluid duct 163 and 173, whereby the hydraulic pressure in the suction port of hydraulic motor 105 is kept sufficient to smoothly stop hydraulic motor 105.

When upper kidney port 108c3 serves as a delivery port of hydraulic pump 104, and lower kidney port 108c4 serves as a suction port of hydraulic pump 104, vice versa.

Referring to FIG. 15, speed reduction device 106 in motor unit 100 will be described. Speed reduction device 106 is a planetary gear mechanism including a sun gear shaft 180, a first sun gear 182, a second sun gear 183, a carrier 184, a first planetary gear 185, a second planetary gear 186, and an internal gear 116a formed on an inner peripheral surface of sprocket axial casing 116.

Sun gear shaft 180 is disposed coaxially to motor shaft 118, and is joined at a proximal end thereof to a distal end of motor shaft 118 rotatably integrally with motor shaft 118, so that sun gear shaft 180 serves as an input shaft of speed reduction device 106. A distal end of sun gear shaft 180 is supported by sprocket axial casing 116 so that sun gear shaft 180 is allowed to rotate relative to sprocket axial casing 116.

First sun gear 182 is formed (or fixed) on a distal end portion of sun gear shaft 180. Second sun gear 183 is fitted on a portion of sun gear shaft 180 between a distal end wall portion 115b of motor casing 115 and first sun gear 182 so as to be rotatable relative to sun gear shaft 180. Carrier 184 is engaged onto a distal end portion of second sun gear 183 unrotatably relative to second sun gear 183. Carrier 184 is formed with a planetary gear shaft 184a distally laterally extended parallel to sun gear shaft 180. First planetary gear 185 is fitted on planetary gear shaft 184a rotatably relative to carrier 184. First planetary gear 185 meshes with first sun gear 182 and internal gear 116a.

Motor casing 115 is formed with a planetary gear shaft 115c extended distally laterally from distal end wall portion 115b and parallel to sun gear shaft 180. Second planetary gear 186 is fitted on planetary gear shaft 115c rotatably relative to motor casing 115. Second planetary gear 186 meshes with second sun gear 183 and internal gear 116a.

Speed reduction device 106 having the above-mentioned structure reduces the speed of rotary power received from motor shaft 118 via sun gear shaft 180, and outputs the speed-reduced rotary power to sprocket axial casing 116, so that sprocket axial casing 116 serves as an output shaft of speed reduction device 106 for driving drive sprocket 92.

It is further understood by those skilled in the art that the foregoing description is given to preferred embodiments of the disclosed apparatus and that various changes and modifications may be made in the invention without departing from the scope thereof defined by the following claims.

Especially, front portions 32Rb and 32Lb of center sections 32R and 32L, front portions 80Rb and 80Lb of center sections 80R and 80L, and discoid portion 110 of second divisional member 109 of center section 103, which are provided for mounting respective hydraulic motors and speed reduction devices, are defined in the foregoing description as being extended in the fore-and-aft direction of skid steer loader 1 or track loader 90, however, they may be redefined as being perpendicular to the lateral direction of loader 1 or 90, e.g., as being vertical if loader 1 or 90 is designed to have such arranged center sections.

What is claimed is:

1. A power transmission assembly for a vehicle, wherein the vehicle includes a prime mover having a prime mover output shaft, and includes right and left traveling devices, the power transmission assembly comprising:

a power distribution unit; and right and left transmission units, wherein the power distribution unit receives a rotary power from the prime mover output shaft, and distributes the rotary power between the right and left transmission units, and wherein the right and left transmission units transmit the distributed rotary powers to the respective right and left traveling devices, each of the right and left transmission units including:

a center section including a closed fluid circuit, wherein the center section is bent to have a first portion extended in the lateral direction of the vehicle, and to have a second portion extended perpendicular to the lateral direction of the vehicle, such that the center section includes an L-shaped plate when viewed in plan;

a hydraulic pump including a pump shaft, wherein the hydraulic pump is mounted on the first portion of the center section so as to extend the pump shaft parallel to the prime mover output shaft;

a hydraulic motor including a motor shaft, wherein the hydraulic motor is mounted on the second portion of the center section so as to be fluidly connected to the hydraulic pump via the closed fluid circuit, and so as to have the motor shaft extended in the lateral direction of the vehicle;

a speed reduction device transmitting power outputted from the hydraulic motor to the corresponding right or left traveling device; and a sprocket axial casing rotatably fitted to the hydraulic motor, wherein the sprocket axial casing incorporates the speed reduction device, and a drive sprocket fixed to an outer circumferential surface of the sprocket axial casing is configured as an output member of the speed reduction device, wherein each of the right and left transmission units includes the hydraulic pump mounted on a distal side of the first portion of the center section, and includes the hydraulic motor mounted on a distal side of the second portion of the center section, and includes the speed reduction device mounted on a distal side of the hydraulic motor.

2. The power transmission assembly according to claim 1, wherein the power transmission assembly is supported on a chassis of the vehicle via the speed reduction devices of the right and left transmission units.

* * * * *